United States Patent
Kim et al.

(10) Patent No.: US 10,110,290 B2
(45) Date of Patent: Oct. 23, 2018

(54) TERMINAL FOR PERIODICALLY TRANSMITTING CSI FEEDBACK INFORMATION

(71) Applicant: ELECTRONICS AND TELECOMMUNICATIONS RESEARCH INSTITUTE, Daejeon (KR)

(72) Inventors: Cheulsoon Kim, Daejeon (KR); Sung-Hyun Moon, Daejeon (KR); Gi Yoon Park, Daejeon (KR); Wooram Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 31 days.

(21) Appl. No.: 15/236,158

(22) Filed: Aug. 12, 2016

(65) Prior Publication Data
US 2017/0047978 A1    Feb. 16, 2017

(30) Foreign Application Priority Data

Aug. 13, 2015  (KR) .................. 10-2015-0114926
Aug. 26, 2015  (KR) .................. 10-2015-0120416
(Continued)

(51) Int. Cl.
*H04B 7/0456* (2017.01)
*H04B 7/06* (2006.01)
*H04L 5/00* (2006.01)

(52) U.S. Cl.
CPC ........... *H04B 7/0626* (2013.01); *H04B 7/063* (2013.01); *H04B 7/0632* (2013.01); *H04L 5/0057* (2013.01)

(58) Field of Classification Search
CPC .... H04B 7/0626; H04B 7/0632; H04B 7/063; H04L 5/0057
See application file for complete search history.

(56) References Cited

U.S. PATENT DOCUMENTS 8,675,794 B1 *  3/2014  Perets ................... H04L 1/0003
                                                        375/225
9,203,589 B1 * 12/2015  Perets ................... H04L 5/0057
(Continued)

FOREIGN PATENT DOCUMENTS

WO    WO-2014/193718 A1    12/2014

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP Standard; 3GPP TS 36.213, 3rd Generation Partnership Project (3GPP), vol. RAN WG1, No. V12.3.0, pp. 1-212, Sep. 26, 2014.
(Continued)

*Primary Examiner* — Jay P Patel
(74) *Attorney, Agent, or Firm* — Rabin & Berdo, P.C.

(57) ABSTRACT

Disclosed herein is a terminal including: receiving a CSI-RS from a base station, generating CSI feedback information including indicators such as RI, PTI, and BI and a first PMI and a second PMI that are elements of a double codebook, on the basis of the CSI-RS and transmits the CSI feedback information to the base station through an uplink subframe corresponding to predetermined feedback periodicity.

12 Claims, 10 Drawing Sheets

(30) Foreign Application Priority Data

| Sep. 21, 2015 | (KR) | 10-2015-0133330 |
|---|---|---|
| Sep. 25, 2015 | (KR) | 10-2015-0136360 |
| Oct. 13, 2015 | (KR) | 10-2015-0143059 |
| Nov. 16, 2015 | (KR) | 10-2015-0160417 |
| Aug. 12, 2016 | (KR) | 10-2016-0102757 |

(56) References Cited

U.S. PATENT DOCUMENTS

| 9,544,801 B2 * | 1/2017 | Han | H04W 24/02 |
|---|---|---|---|
| 2009/0154588 A1 * | 6/2009 | Chen | H04L 1/0026 |
| | | | 375/267 |
| 2009/0225906 A1 * | 9/2009 | Roh | H04L 1/0045 |
| | | | 375/340 |
| 2009/0245284 A1 * | 10/2009 | Xu | H04L 1/0028 |
| | | | 370/474 |
| 2011/0110455 A1 * | 5/2011 | Gaal | H04L 5/14 |
| | | | 375/295 |
| 2011/0268204 A1 * | 11/2011 | Choi | H04B 7/0639 |
| | | | 375/260 |
| 2012/0182895 A1 | 7/2012 | Jwa | |
| 2013/0064128 A1 | 3/2013 | Li et al. | |
| 2014/0010126 A1 | 1/2014 | Sayana et al. | |
| 2014/0177683 A1 * | 6/2014 | Krishnamurthy | H04B 7/0469 |
| | | | 375/219 |
| 2014/0177744 A1 * | 6/2014 | Krishnamurthy | H04B 7/0469 |
| | | | 375/267 |
| 2014/0177745 A1 * | 6/2014 | Krishnamurthy | H04B 7/0413 |
| | | | 375/267 |
| 2014/0254517 A1 | 9/2014 | Nam et al. | |
| 2015/0156000 A1 | 6/2015 | Ko et al. | |
| 2015/0280801 A1 * | 10/2015 | Xin | H04B 7/0478 |
| | | | 370/329 |
| 2015/0288439 A1 * | 10/2015 | Kim | H04B 7/0469 |
| | | | 375/295 |
| 2016/0157218 A1 * | 6/2016 | Nam | H04B 7/0456 |
| | | | 370/329 |
| 2016/0323022 A1 * | 11/2016 | Rahman | H04B 7/0469 |
| 2016/0373178 A1 * | 12/2016 | Nam | H04B 7/0639 |
| 2017/0006491 A1 * | 1/2017 | Chen | H04B 7/024 |
| 2017/0111898 A1 * | 4/2017 | Han | H04W 72/0413 |
| 2017/0201308 A1 * | 7/2017 | Park | H04B 7/0626 |

OTHER PUBLICATIONS

"CSI feedback for beamformed CSI-RS on PUCCH", 3rd Generation Partnership Project (3GPP), 3GPP TSG RAN WG1 Meeting #82, R1-153945, Beijing, China, Aug. 24-28, 2015.

"CSI feedback for beamformed CSI-RS on PUSCH", 3rd Generation Partnership Project (3GPP), 3GPP TSG RAN WG1 Meeting #82, R1-153946, Beijing, China, Aug. 24-28, 2015.

"Discussion on CSI feedback schemes for class B CSI reporting", 3rd Generation Partnership Project (3GPP), 3GPP TSG-RAN WG1 #82bis, R1-155740, Malmö, Sweden, Oct. 5-9, 2015.

"3rd Generation Partnership Project; Technical Specification Group Radio Access Network; Evolved Universal Terrestrial Radio Access (E-UTRA); Physical layer procedures (Release 13)", 3GPP Standard; 3rd Generation Partnership Project (3GPP), vol. RAN WG1, No. V13.0.1, pp. 7-224, Jan. 26, 2016.

R1—154398, "Periodic CSI reporting for elevation beamforming", 3GPP TSG RAN WG1 Meeting #80, Beijing, China, Aug. 24-28, 2015.

3GPP, "3rd Generation Partnership Project; Technical Specification Group Radio Access Network; Evolved Universal Terrestrial Radio Access (E-UTRA); Physical layer procedures, (Release 13)", 3GPP TS 36.213 V13.0.0, Dec. 2012.

* cited by examiner

TERMINAL FOR PERIODICALLY TRANSMITTING CSI FEEDBACK INFORMATION

CROSS-REFERENCE TO RELATED APPLICATION

This application claims priority to and the benefit of Korean Patent Application Nos. 10-2015-0114926, 10-2015-0120416, 10-2015-0133330, 10-2015-0136360, 10-2015-0143059, 10-2015-0160417, and 10-2016-0102757 filed in the Korean Intellectual Property Office on Aug. 13, 2015, Aug. 26, 2015, Sep. 21, 2015, Sep. 25, 2015, Oct. 13, 2015, Nov. 16, 2015, and Aug. 12, 2016, the entire contents of which are incorporated herein by reference.

BACKGROUND OF THE INVENTION (a) Field of the Invention

The present description relates to a terminal for periodically transmitting CSI feedback information to a base station.

(b) Description of the Related Art

In a wireless communication system, a first device (e.g., base station) periodically transmits a reference signal (RS) and a second device (e.g., terminal) receives the reference signal to generate a channel state information (CSI) report. The terminal periodically or aperiodically feedbacks the CSI report to the base station on the base of setting of the base station. The CSI report consists of rank indication (RI) of a radio channel, channel quality information (CQI), and a precoding matrix indicator (PMI). The CSI report may be performed by implicit feedback. The RI, the CQI, and the PMI each have different coherence time, and therefore in the wireless communication system, generally, the R1, the CQI, and the PMI are independently encoded and are fed back at separate periods.

When the base station performs elevation beamforming, the terminal uses the reference signal to feedback a horizontal domain CSI (hCSI) and a vertical domain CSI (vCSI) to the base station. In this case, the base station transmits PMI codebook information that may recognize the hCSI and the VCSI to the terminal in advance. The CSI report generated from the terminal may be a 2-dimensional joint CSI at which the hCSI and the vCSI both are calculated or the hCSI and the vCSI separately derived.

When the terminal periodically transmits the CSI report, the terminal uses a unit feedback channel (e.g., physical uplink control channel (PUCCH)). A transmission of one unit feedback channel may be determined as a payload that is equal to or less than the number of bits previously determined to secure uplink coverage.

The above information disclosed in this Background section is only for enhancement of understanding of the background of the invention and therefore it may contain information that does not form the prior art that is already known in this country to a person of ordinary skill in the art.

SUMMARY OF THE INVENTION

The present description has been made in an effort to provide a terminal for transmitting indication information of a beam or indication information of a reference resource to a base station.

Further, the present description has been made in an effort to provide a terminal for transmitting a PMI component of a double codebook to a base station so that the base station performs vertical beamforming.

An exemplary embodiment provides a terminal, including: a processor, a memory, and a radio frequency unit, in which the processor executes a program stored in the memory to perform: receiving a channel state information-reference signal (CSI-RS) from a base station; generating CSI feedback information including rank indication (RI), a beam index (BI), at least one wideband channel quality indicator (WB CQI), a WB first precoding matrix indicator (PMI), and a WB second PMI, on the basis of the CSI-RS; transmitting the RI and the BI in an uplink subframe corresponding to periodicity of a first feedback subframe; and transmitting the at least one WB CQI, the WB first PMI and the WB second PMI in an uplink subframe corresponding to periodicity of a second feedback subframe.

The BI may be the CSI feedback information used to transmit indication information of a beam transmitting the CSI-RS or indication information of the CSI-RS to the base station.

When the processor performs transmitting the RI and the BI in the uplink subframe corresponding to the periodicity of the first feedback subframe, the processor may perform separately encoding the BI from the RI.

When the processor performs transmitting the RI and the BI in the uplink subframe corresponding to the periodicity of the first feedback subframe, the processor may perform jointly encoding the BI and the RI.

When the processor performs transmitting the RI and the BI in an uplink subframe corresponding to the periodicity of the first feedback subframe, the processor may concatenating the BI to the RI and encoding the BI and the RI using a (20, k) block code.

The at least one WB CQI may include a WB spatial differential CQI of 3 bits representing a difference between two WB CQIs.

The WB first PMI and the WB second PMI may be elements of a double codebook and the PMI of the double codebook may be represented by a matrix multiplication or a Kronecker product of the WB first PMI and the WB second PMI, or represented by a pair of index that indicates the WB first PMI and the WB second PMI.

Another embodiment provides a terminal, including: a processor, a memory, and a radio frequency unit, in which the processor executes a program stored in the memory to perform: receiving a channel state information-reference signal (CSI-RS) resource from a base station; generating CSI feedback information including rank indication (RI), a beam index (BI), at least one wideband channel quality indicator (WB CQI), a WB first precoding matrix indicator (PMI), and a WB second PMI, on the basis of the CSI-RS; transmitting the RI, the WB first PMI, and the BI in an uplink subframe corresponding to periodicity of a first feedback subframe; and transmitting the at least one WB CQI and the WB second PMI in an uplink subframe corresponding to periodicity of a second feedback subframe.

The BI may be the CSI feedback information used to transmit indication information of a beam transmitting the CSI-RS or indication information of the CSI-RS to the base station.

When the processor performs transmitting the RI, the WB first PMI, and the BI in the uplink subframe corresponding to the periodicity of the first feedback subframe, the processor may perform jointly encoding the RI, the WB first PMI, and the BI.

When the processor performs transmitting the RI, the WB first PMI, and the BI in the uplink subframe corresponding to the periodicity of the first feedback subframe, the processor may perform jointly encoding the RI and the WB first PMI and concatenating a bit stream of the BI to the jointly encoded RI and WB first PMI.

The at least one WB CQI may include a WB spatial differential CQI of 3 bits representing a difference between two WB CQIs.

The WB first PMI and the WB second PMI may be elements of a double codebook and the PMI of the double codebook may be represented by a matrix multiplication or a Kronecker product of the WB first PMI and the WB second PMI, or represented by a pair of index that indicates the WB first PMI and the WB second PMI.

Yet another embodiment provides a terminal, including: a processor, a memory, and a radio frequency unit, in which the processor executes a program stored in the memory to perform: receiving a channel state information-reference signal (CSI-RS) resource from a base station; generating CSI feedback information including rank indication (RI), a beam index (BI), a precoding type indicator (PTI), at least one wideband channel quality indicator (WB CQI), a WB first precoding matrix indicator (PMI), and a WB second PMI, on the basis of the CSI-RS; transmitting the RI, the PTI, and the BI in an uplink subframe corresponding to periodicity of a first feedback subframe; and when the PTI represents a first value, transmitting the WB first PMI in an uplink subframe corresponding to periodicity of a second feedback subframe; and transmitting the at least one WB CQI and the WB second PMI in an uplink subframe corresponding to periodicity of a third feedback subframe.

The processor may execute the program to further perform: generating CSI feedback information including at least one subband channel quality indicator (SB CQI), an SB second PMI, and an SB index, on the basis of the CSI-RS, and when the PTI represents a second value, transmitting the at least one WB CQI and the WB second PMI in the uplink subframe corresponding to the periodicity of the second feedback subframe; and transmitting the at least one SB CQI, the SB second PMI, and the SB index in the uplink subframe corresponding to the periodicity of the third feedback subframe.

The BI may be the CSI feedback information used to transmit indication information of a beam transmitting the CSI-RS or indication information of a CSI-RS to the base station.

When the processor may perform transmitting the RI, the PTI, and the BI in the uplink subframe corresponding to the periodicity of the first feedback subframe, the processor may perform jointly encoding the RI, the PTI, and the BI.

When the processor performs transmitting the RI, the PTI, and the BI in the uplink subframe corresponding to the periodicity of the first feedback subframe, the processor may perform jointly encoding the BI and the RI, and concatenating a bit representing the PTI to the BI and the RI.

When the processor performs transmitting the RI, the PTI, and the BI in the uplink subframe corresponding to the periodicity of the first feedback subframe, the processor may perform jointly encoding the RI and the PTI, and concatenating a bit representing the BI to the RI and the PTI.

The at least one WB CQI may include a WB spatial differential CQI of 3 bits representing a difference between two WB CQIs.

the at least one SB CQI may include a SB spatial differential CQI of 3 bits representing a difference between two SB CQIs.

DETAILED DESCRIPTION OF THE EMBODIMENTS

Figure 1:
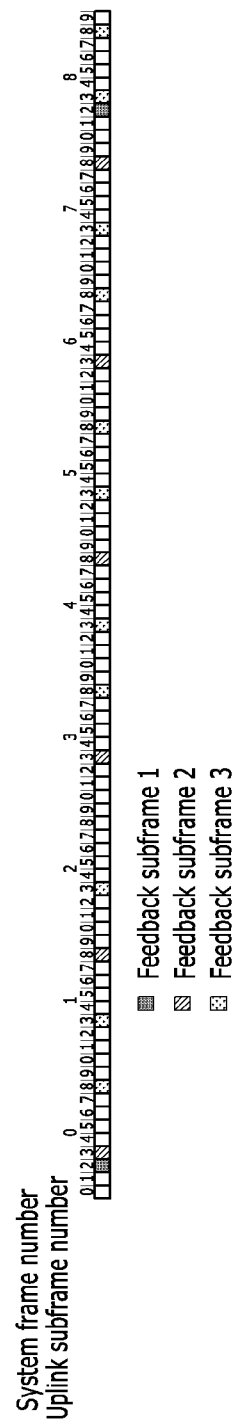
FIG. 1 is a diagram illustrating a feedback subframe transmitting a CSI report in which a double 2-dimensional CB is used, according to an exemplary embodiment.

Hereinafter, exemplary embodiments will be described in detail with reference to the accompanying drawings so that those skilled in the art may easily practice the present invention. However, the present description may be modified in various different ways and is not limited to embodiments described herein. In the accompanying drawings, portions unrelated to the description will be omitted in order to obviously describe the present description, and similar reference numerals will be used to describe similar portions throughout the present specification.

Throughout the specification, a terminal may be called a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine type communication device (MTC device), and the like and may also include all or some of the functions of the MS, the MT, the AMS, the HR-MS, the SS, the PSS, the AT, the UE, the MTC device, and the like.

Further, the base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femoto BS), a home node B (HNB), a home eNodeB (HeNB), a pico base station (pico BS), a macro base station (macro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

In the present description, a codebook (CB) is called a double CB. Generally, a PMI of the double CB may be represented by a matrix multiplication (or Kronecker product) of a $1^{st}$ PMI (W1) and a $2^{nd}$ PMI (W2), or by a pair of index that indicates $1^{st}$ PMI and $2^{nd}$ PMI. In the present description, the $1^{st}$ PMI and the $2^{nd}$ PMI means a horizontal domain PMI (hPMI) and a vertical domain PMI (vPMI), respectively, or PMI components of a 2-dimensional CB including only the hPMI. In the present description, the vertical domain CSI may be represented by using a beam index (BI) instead of the vertical domain PMI. The $1^{st}$ PMI and the $2^{nd}$ PMI configuring the double CB may mean PMI components of 1-dimensional CB including only the hPMI. The $1^{st}$ PMI may be defined as a wideband (WB) regardless of the hPMI and the vPMI and the $2^{nd}$ PMI may be defined as a wideband or a subband (SB) depending on configurations of the base station.

In the present description, a method (Class A) for forming, by a base station, one beam and performing, by a terminal, feedback of one beam and a method (Class B) for forming, by a base station, a plurality of beams and performing, by the terminal, feedback one or some of a plurality of beams both are considered. In the case of the Class B, to transmit indication information of a beam that transmits CSI-RS resource selected by the terminal or indication information of the CSI-RS resource selected by the terminal to the base station, the terminal may use a beam selection indicator, a beam index (BI), or a CSI-RS resource indicator (CRI). The BI and the CRI may be used to represent an antenna port configuring a pilot resource (i.e., channel state information reference signal (CSI-RS)), called a beam for transmitting a pilot resource of one group, or called a specific CSI-RS resource among CSI-RS resource groups. The CSI-RS of one group may be transmitted through the same beam, and therefore, in the following description, the BI and the CRI are used as the same meaning.

In the present description, the terminal may carry some of the CSI feedback information generated based on the CSI-RS on a feedback channel periodically transmitted to the base station. In this case, the CSI feedback information includes a CSI report. The terminal may transmit the feedback channel plural times and may transmit a CQI through a final feedback channel for transmitting one CSI report. The base station may store the feedback channel of the terminal received plural times in a memory. The base station may derive the RI and the PMI, which are used to enable the terminal to derive the CQI, from the stored feedback channel. The terminal may perform a PMI partitioning according to a predetermined rule, and transmit the partitioned PMI through the feedback channel.

A method for partitioning a PMI is as follows. In this case, the partitioning means functional partitioning of the PMI. The partitioned PMI may not be a unit of a channel coding or a unit of a PMI feedback. According to a configuration of the base station, the terminal may encode a plurality of the partitioned PMIs by considering them as a PMI unit, and transmit them to the base station. The base station is not able to perform a precoding by using each partitioned PMI.

In the present description, the PMI is divided into PMI_1 and PMI_2, in which the PMI_1 may be divided into PMI_1-1 and PMI_1-2. And PMI_2 is not devided, or if necessary, the PMI_2 may be divided into PMI_2-1 and PMI_2-2. Each PMI_1, PMI_1-1, PMI_1-2, PMI_2, PMI_2-1, PMI_2-2 can be represented by a matrix or by an index that indicates matrix in the predefined PMI table.

Method 100: The PM_1 Corresponds to a WB PMI and the PMI_2 Corresponds to an SB PM1.

In the method 100, the PMI consists of the double CB, and therefore may be represented by a matrix multiplication of the PMI_1 and the PMI_2 or a pair of index that indicates PMI_1 and PMI_2. The PMI_1 and the PMI_2 may each be elements of the 2-dimensional CB and may be individually used by precoding and may be included in different 2-dimensional CBs. When the PMI_1 is divided into the vertical CSI and the horizontal CSI, the PMI_1-1 may represent the vertical PMI and the PMI_1-2 may represent the horizontal PMI. The PMI_1-1 and the PMI_1-2 each are components of the PMI, and therefore may not be individually used for precoding and may be used as the PMI when the PMI_1-1 and the PMI_1-2 are combined or paired to indicate the PMI_1.

Method 100-1: The PMI_1-1 is Allocated as a Wideband Vertical PMI Component and the PMI_1-2 is Allocated as a Wideband Horizontal PMI Component.

In the method 100-1, the PMI_1 may be defined as an operation of the PMI_1-1 and the PMI_1-2. For example, the PMI_1 may be defined by the Kronecker product of the PMI_1-1 and the PMI_1-2 or defined by a pair of index that indicates PMI_1-1 and PMI_1-2. Further, the PMI_2 may be divided into the following methods 100-1-1, 100-1-2, and 100-1-3. The PMI_2 may be solely defined, or may be defined as an operation of the PMI_2-1 and the PMI_2-2, or a pair of index that indicates PMI_2-1 and PMI_2-2. For example, the PMI_2 may be defined by the matrix product of the PMI_2-1 and the PMI_2-2.

Method 100-1-1: The PMI_2-1 is Allocated as a Subband Vertical PMI Component and the PMI_2-2 is Allocated as a Subband Horizontal PMI Component.

In the method 100-1-1, like the PMI_1, the PMI_2 may also be defined by the operation of the PMI_2-1 and the PMI_2-2. In this case, the PMI_2-1 may not include a cophase component.

Method 100-1-2: The PMI_2-1 is Allocated as a Beam Selection Component and the PMI_2-2 is Allocated as a Cophase Component.

In the method 100-1-2, the PMI_2 is used to select at least one beam in a beam space formed by the PMI_1 and used to define the cophase between cross polarizations. The PMI_2-1 may include the beam selection component and the PMI_2-2 may include the cophase component.

Method 100-1-3: The PMI_2-1 is Allocated as the Beam Selection Component and the PMI_2-2 is Allocated as the Beam Selection Component and the Cophase Component.

In the method 100-1-3, some of the beam selection component is allocated to the PMI_2-2. For example, the PMI_2-1 may be used to perform the vertical beam selection and the PMI_2-2 may be used to perform the horizontal beam selection and the cophase.

Method 101: In the PMI_1, the PMI_1-1 is interpreted as BI and the PMI_1-2 is interpreted as a $1^{st}$ hPMI. In the foregoing method 100, 100-1, 100-2, 100-1-1, 100-1-2, and 100-1-3, the terminal may derive the RI and the PMI for one beam. On the contrary, the terminal in the method 101 may measure one beam or a plurality beams, and select a beam for PMI derivation. In the method 101, the terminal may derive the RI and the remaining PMI for the selected beam by using the BI or the PMI_1-1. The remaining PMI may include be PMI_1-2 and PMI_2, or PMI_1-2, PMI_2-1, and PMI_2-2.

In the method 101, the PMI_2 is interpreted as a $2^{nd}$ hPMI, when the PMI_2 is divided, the PMI_2-1 is allocated as the beam selection component, and the PMI_2-2 is interpreted as the cophase component.

Method 110: The PMI_1 is Interpreted as a vPMI and the PMI_2 is Interpreted as an hPMI.

In the method 110, the PMI consists of the 2-dimensional CB, and therefore each direction may be represented based on the PMI_1 and the PMI_2. Therefore, the PMI_1 and the PMI_2 may not be separately used for precoding. The base station may receive the PMI_1 and the PMI_2 from the terminal and then reconstruct the received PMI_1 and PMI_2 as the PMI. In this case, a method for reconstructing a PMI includes the Kronecker product or the mapping to a pair of index that indicates PMI_1 and PMI_2. In this case, the PMI_1 may be interpreted as an element of the double CB and may be divided into the wideband component and the subband component and the wideband component and the subband component may each be allocated to the PMI_1-1 and the PMI_1-2. The PMI_2 may also be partitioned as a similar way of the PMI_1.

A WB CQ/single PMI report and a UE-selected SB CQI/single PMI report will be described below in detail.

First, a method for transmitting, by a terminal, feedback information including a wideband CQI and a single PMI report will be described.

Among a plurality of feedback subframes, a feedback subframe 1 may include at least RI. Further, the feedback subframe 1 may include the vPMI or the hPMI, or may include a part of the partitioned PMIs depending on a CSI feedback mode that is configured in the terminal by the base station. Periodicity and subframe offset of the feedback subframe 1 may follow the LTE standard. The rest feedback subframe other than the feedback subframe 1 may have separate periodicity and subframe offset.

When the feedback subframe that does not include the RI is plural, priority may be set between the feedback subframes that do not include the RI. For example, when a feedback subframe 2 has higher priority than a feedback subframe 3, periodicity of the feedback subframe 3 may be configured as that of the CQI/PMI subframe and periodicity of the feedback subframe 2 may be set to be longer than that of the feedback subframe 3. In this case, the periodicity of the feedback subframe 2 may be n times as large as that of the feedback subframe 3 (where n is a natural number), in which n may be configured in the terminal by the base station. When the same subframe offset is set between the respective feedback subframes, the feedback subframe having higher priority may be transmitted and the feedback subframe having lower priority may not be transmitted.

One CSI report may include two or three feedback subframes in consideration of a coherence time of a radio channel. In the following methods 200 and 210, the CQI is transmitted at a $3^{rd}$ feedback subframe. Further, an order of priority of the feedback subframes is feedback subframe 1>feedback subframe 2>feedback subframe 3. Further, three feedback subframes each have different periodicities. The terminal may transmit one feedback subframe through an uplink subframe. The respective feedback subframes may include at least one CSI component according to the following methods. First, class A in which the terminal generates feedback information on one beam will be described in detail on the basis of the following methods 200, 205, 205-1, 205-2, 206, 210, 215, and 216.

Method 200: Class A

In the method 200, the feedback subframe 1 includes the RI, the feedback subframe 2 includes 'WB PMI_1' and 'WB PMI_2-1', and the feedback subframe 3 includes 'WB CQI(s)' and 'WB PMI_2-2'. Hereinafter, 's' in a parenthesis of the 'WB CQI(s)' is a symbol representing a plural form, and therefore the 'WB CQI(s)' means 'a plurality of WB CQIs'. One of the plurality of WB CQIs is WB CQI and another WB CQI may be WB spatial differential CQI. The WB spatial differential CQI represents a difference between two WB CQIs and is 3 bits.

In the method 200, the PMI that is applied to a downlink data transmission by the base station may be derived from PMI component 1 (i.e., PMI_1) and PMI component 2 (i.e., PMI_2). One PMI component may also be an element representing 2-dimensional precoding or may also be an element selected from a 1-dimensional CB individually included. For example, when the PMI component is the element representing the 2-dimensional precoding, if the 2-dimensional CB has the double CB structure, the PMI may be given as the matrix multiplication of the PMI_1 and the PMI_2, or a pair of index that indicates PMI_1 and PMI_2. In this case, the CB including the PMI_1 and the CB including the PMI_2 may be different. Alternatively, when each PMI component is the element selected from the 1-dimensional CB, the 2-dimensional CB may be determined as an operation of two 1-dimensional CBs and the 2-dimensional precoding may be given as the Kronecker product of the PMI_1 and the PMI_2. In this case, the CB including the PMI_1 and the CB including the PMI_2 may be different.

In the method 200, WB PMI_2 may be divided into two segments (WB PMI_2-1 and WB PMI_2-2) depending on the amount of a CSI payload of the feedback subframe 2. In this case, a pair of index that indicates WB PMI_2-1 and WB PMI_2-2 one-to-one corresponds to WB PMI_2. For example, the WB PMI component may be divided into a segment including a beam index and a segment including a cophase. When a PMI bit field representing one PMI component is large, the PMI component having the large bit field may be divided into a segment including a most significant bit (MSB) and a segment including a least significant bit (LSB). Alternatively, one WB PMI component may be divided into a segment including a horizontal CSI and a segment including a vertical CSI. The terminal may allocate different segments to different feedback subframes.

In the method 200, the feedback subframe 2 that the terminal transmits includes the PMI_1 and the PMI_2-1 and the feedback subframe 3 includes the CQI and the PMI_2-2. In this case, the WB PMI_2-2 may have a coherence time relatively shorter than that of WB PMI_2-1. For example, when the PMI_2 consists of the beam index and the cophase of the 2-dimensional CB, the beam index may be allocated to the PMI_2-1 and the cophase may be allocated to the PMI_2-2.

In the method 200, the 2-dimensional CB may be decomposed into the vertical CB and the horizontal CB. In this case, the PMI_1 and the PMI_2 may each correspond to the vPMI and the hPMI. When the vertical CB and the horizontal CB are the double CB structure, the PMI segment may be represented by the $1^{st}$ PMI or the $2^{nd}$ PMI.

Method 205: Class A

In the method 205, the feedback subframe 1 includes the RI, the feedback subframe 2 includes 'WB V1', 'WB V1', and 'WB H1', and the feedback subframe 3 includes 'WB CQI(s)' and 'WB H2'.

In the above method 205, the feedback subframe 1 may include only the RI. The feedback subframe 2 has higher priority and longer periodicity than the feedback subframe 3. In this case, the WB V2 does not include the cophase component and includes the beam selection component. The WB H2 does not include the beam selection component but may include the cophase component or may include both of the beam selection component and the cophase component.

In the method 205, the WB V1 and the WB V2 may be separately encoded from the WB H1. The number of CSI bits of the WB V1 and the WB V2 may be managed by the methods 205-1 and 205-2 described below. The number of CSI bits may be determined depending on a function of the number of CSI-RS ports and a 2-dimensional array configuration of the CSI-RS port.

Method 205-1: Method for Individually Sub-Sampling WB V1 and WB V2

In the method 205-1, the WB V1 and the WB V2 are each sub-sampled depending on a preset number of bits. The terminal separately derives the index representing the WB V1 and the index representing the WB V2.

Method 205-2: Method for Jointly Encoding WB V1 and WB V2

In the method 205-2, one ordered pair WB V1 and WB V2 one-to-one corresponds to one index. Since V1 and V2 are not independent and the V1 and V2 each are one segment comprised in the vPMI, the number of bits representing both 'WB V1' and 'WB V2' may be smaller than the sub-sampling of the method 205-1. The terminal derives one (combined) index for the 'WB V1' and 'WB V2' and the base station may perform de-mapping the WB V1 and the WB V2 from one index derived from the terminal.

In the method 205, the base station receiving the feedback subframe 3 may calculate the WB H2 and the WB CQI(s) on the basis of R1, WB V1, WB V2, and WB H1 that the terminal has reported lastly. When the RI is larger than 1, i.e., R1>1, the terminal may generate two WB CQIs. The WB spatial differential CQI is a difference between two WB CQIs and is 3 bits.

Method 206: Class A

In the method 206, the feedback subframe 1 includes the RI, the feedback subframe 2 includes 'WB H1' and 'WB V1', and the feedback subframe 3 includes 'WB CQI(s)' and 'WB W2'. That is, unlike the method 205, in the method 206, the feedback subframe 2 does not include the WB V2. The terminal performs the beam selection without distinguishing the vertical and horizontal directions and the cophase between different polarizations. In the method 206, the terminal uses the feedback subframes three times in total. If necessary, the terminal may reduce the CSI payload by sub-sampling the PMI. In this case, the sub-sampling pattern may be different each kind of CBs.

Method 210: Class A

In the method 210, the feedback subframe 1 includes 'RI' and 'WB PMI_1-1', the feedback subframe 2 includes 'WB PMI_1-2' and 'WB PMI_2-1', and the feedback subframe 3 includes 'WB CQI(s)' and 'WB PMI_2-2'. In the method 210, the 2-dimensional precoding consists of two PMI components and each PMI component may again consist of two or less than two PMI segments. Further, the two PMI segments indicating the PMI_1 and the PMI_2 may be carried on different feedback subframes. Therefore, the feedback subframe 1 includes the R1 and the WB PMI_1-1 and the feedback subframe 2 are both of the WB PMI_1-2 and the WB PMI_2-1. The PMI component and the PMI segment may be used by the same method as the method 200. In the method 210, the coherence time of the PMI_1-1 may be longer than that of the PMI_1-2 and the coherence time of the PMI_2-1 may be longer than that of PMI_2-2.

The feedback subframe including the PMI segments (i.e., PMI_1-1, PMI_1-2, PMI_2-1, PMI_2-2) may employ a physical uplink control channel format 2 (PUCCH format 2).

In the method 210, the 2-dimensional CB may be decomposed into the vertical CB (V CB) and the horizontal CB (H CB). In this case, the PMI_1 and the PMI_2 may each correspond to the vPMI and the hPMI. Considering the V CB and the H CB having the double CB structure, the PMI segment may correspond to the $1^{st}$ PMI or the $2^{nd}$ PMI if the PMI_1 or the PMI_2 have two PMI segments, and the PMI segment may correspond to the $1^{st}$ PMI if the PMI_1 or the PMI_2 have one PMI segment.

Method 215: Class A

In the method 215, the feedback subframe 1 includes 'RI' and 'WB V1', the feedback subframe 2 includes 'WB V2' and 'WB H1', and the feedback subframe 3 includes 'WB CQI(s)' and 'WB H2'. In the method 215, the R1 and the WB V1 are included in the feedback subframe 1 while being jointly encoded. The feedback subframe 2 has higher priority and longer periodicity than the feedback subframe 3. At the feedback subframe 2, the WB V2 and the WB H1 independently represent the PMI information, and therefore may be separately encoded. The WB H2 included in the feedback subframe 3 may include both of the beam selection component and the cophase component or only the cophase component. On the other hand the WB V2 may not include the cophase but include the beam selection component.

Method 216: Class A

In the method 216, the feedback subframe 1 includes 'RI' and 'WB V1', the feedback subframe 2 includes 'WB H1', and the feedback subframe 3 includes 'WB CQI(s)' and 'WB H2'. That is, the method 216 does not include the WB V2 of the method 215. In the method 216, the terminal may perform the beam selection in the H2 without distinguishing the vertical and horizontal directions and may derive the cophase between different polarizations. That is, the H2 may be same with a role of the W2 in a double CB including PMI configured by the W1 and the W2. The terminal uses the feedback subframes three times to transmit the CSI report and except for the 'RI' and 'WB V1' included in the feedback subframe 1, the existing terminal may also transmit the feedback subframe 2 and the feedback subframe 3 that support the existing LTE standards.

FIG. 1 is a diagram illustrating a feedback subframe transmitting a CSI report in which a double 2-dimensional CB is used, according to an exemplary embodiment.

Referring to FIG. 1, the CSI report includes the wideband CQI and the single PMI and are periodically transmitted through three distinct feedback subframes. Each feedback subframe may be transmitted at different periodicities and in different priorities. Referring to FIG. 1, the feedback subframe 1 has the longest periodicity and the highest priority. The periodicity of the feedback subframe 2 is 10 subframes and the periodicity of the feedback subframe 3 is 5 subframes. If the feedback subframe 2 and the feedback subframe 3 overlap, the priority of the feedback subframe 2 is higher than that of the feedback subframe 3, and therefore the feedback subframe 2 is transmitted. The feedback subframe 1, the feedback subframe 2, the feedback subframe 3 illustrated in FIG. 1 may be used in the methods 200, 205, 205-1, 205-2, 206, 210, 215, and 216. Class B in which the terminal generates feedback information on at least one of a plurality of beams will be described in detail on the basis of the following methods 231, 232, and 233.

Method 231: Class B, K>1

In the method 231, the feedback subframe 1 includes the R1 and the BI or the RI. When the feedback periodicity of the B1 is an integer multiple of the feedback periodicity of the R1, the feedback subframe 1 may include only the RI. The feedback subframe 2 includes the WB CQI(s), the WB W1, and the WB W2. In this case, the WB W1 and the WB W2 are components of the WB PMI of the double CB, in which the WB PMI of the double CB may be represented by a matrix multiplication (Kronecker product) of the WB W1 and the WB W2 or a pair of index that indicates WB W1 and WB W2.

Comparing the feedback subframes of the periodic CSI feedback mode 1-1 and the sub mode 2 of the LTE standard to the feedback subframes in the method 231, in the feedback subframe 1 of the method 231, the BI is additionally transmitted. The terminal may use the following methods 610, 620, and 630 to encode the RI and the BI, thereby generating the feedback subframe 1. A method for encoding RI and BI is as follows.

In the case of the class B, the base station may configure the feedback of the BI in the terminal The BI and the RI may be jointly encoded or may also be separately encoded.

The BI is up to 3 bits and may be encoded by the same method as the method applied to the RI in the LTE standard.

Method 610: Method for Separately Encoding BI from RI when Uplink Data or CSI Trigger from the Base Station is Present (Method for Independently Encoding BI from RI).

The method 610 enables the terminal to perform the BI feedback simultaneously with the data transmission or the CSI report when the base station grants the terminal to transmit uplink data when the terminal performs periodic CSI report in the same uplink subframe or when the base station instructs the terminal to perform the CSI report with or without uplink data at the terminal. In this sentence, the CSI report means the CSI feedback without BI consisting of RI, PMI, and CQI(s). The terminal encodes the concatenated payload by the basis of following methods. The method 610 may be applied to a PUSCH reporting.

When the BI is represented by 1 bit (i.e., $[O_0^{BI}]$), the terminal encodes the BI on the basis of the following Tables 1 and 2. The following Table 1 shows a mapping relationship between $O_0^{BI}$ and the BI or RI, and the following Table 2 shows the BI encoding with respect to the modulation order.

TABLE 1

| $O_0^{BI}$ | BI |
|---|---|
| 0 | 1 |
| 1 | 2 |

TABLE 2

| Modulation order | Encoded BI |
|---|---|
| 2 | $[O_0^{BI}, y]$ |
| 4 | $[O_0^{BI}, y, x, x]$ |
| 6 | $[O_0^{BI}, y, x, x, x, x]$ |

In the above Table 2, x and y represent a place holder for maintaining bits to maximize a Euclidean distance of the demodulated symbol. It is assumed that the base station knows the number of encoded bits, $Q_{BI}$, that depends on configurations to the terminal. The terminal obtains the encoded bit sequence $[q_0^{BI}, q_1^{BI}, \ldots, q_{Q_{BI}-1}^{BI}]$. For example, when a 64 quadrature amplitude modulation (QAM) is applied, $[q_0^{BI}, q_1^{BI}, \ldots, q_{Q_{BI}-1}^{BI}]$ depends on the following Equation 1.

$$[q_0^{BI}, q_1^{BI}, \ldots, q_{Q_{BI}-1}^{BI}] = [O_n^{BI}, y, x, x, x, x, O_n^{BI}, y, x, x, x, x, \ldots] \quad \text{(Equation 1)}$$

Here, the last bit sequence may not be included.

When the BI are represented by 2 bits (i.e., $[O_0^{BI}, O_1^{BI}]$), the terminal encodes the BI on the basis of the following Tables 3 and 4, and acquires 3 bits (that is, $[[O_0^{BI}, O_1^{BI}], O_2^{BI}]$). In this case, the $O_2^{BI}$ may be determined by the following Equation 2.

$$O_2^{BI} = (O_0^{BI} + O_1^{BI}) \bmod 2 \quad \text{(Equation 2)}$$

The following Table 3 shows a mapping relationship between $O_0^{BI}$ and $O_1^{BI}$ and the BI and the following Table 4 shows the BI encoding with respect to the modulation order.

TABLE 3

| $O_0^{BI}$ | $O_1^{BI}$ | BI |
|---|---|---|
| 0 | 0 | 1 |
|   | 1 | 2 |
| 1 | 0 | 3 |
|   | 1 | 4 |

TABLE 4

| Modulation order ($Q_m$) | Encoded BI |
|---|---|
| 2 | $[O_0^{BI}, O_1^{BI}, O_2^{BI}, O_0^{BI}, O_1^{BI}, O_2^{BI}]$ |
| 4 | $[O_0^{BI}, O_1^{BI}, x, x, O_2^{BI}, O_0^{BI}, x, x, O_1^{BI}, O_2^{BI}, x, x]$ |
| 6 | $[O_0^{BI}, O_1^{BI}, x, x, x, x, O_2^{BI}, O_0^{BI}, x, x, x, x, O_1^{BI}, O_2^{BI}, x, x, x, x]$ |

The terminal obtains the encoded bit sequence $[q_0^{BI}, q_1^{BI}, \ldots, q_{Q_{BI}-1}^{BI}]$, where it is assumed that the base station knows the number of encoded bits, $Q_{BI}$, that depends on configurations to the terminal. For example, when the 64 QAM is applied, $[q_0^{BI}, q_1^{BI}, \ldots, q_{Q_{BI}-1}^{BI}]$ depends on the following Equation 3.

$$[q_0^{BI}, q_1^{BI}, \ldots, q_{Q_{BI}-1}^{BI}] = [O_0^{BI}, O_1^{BI}, x, x, x, x, O_2^{BI}, O_0^{BI}, x, x, x, x, O_1^{BI}, O_2^{BI}, x, x, x, x, O_0^{BI} O_1^{BI}, x, x, x, x, O_2^{BI}, O_0^{BI}, x, x, x, x, O_1^{BI}, O_2^{BI}, x, x, x, x, \ldots] \quad \text{(Equation 3)}$$

Here, the last bit sequence may not be included.

When the BI is represented by 3 bits (i.e., $[O_0^{BI}, O_1^{BI}, O_2^{BI}]$), the terminal encodes the BI on the basis of the following Table 5. The following Table 5 shows a mapping relationship between $O_0^{BI}, O_1^{BI}$, and $O_2^{BI}$.

TABLE 5

| $O_0^{BI}$ | $O_1^{BI}$ | $O_2^{BI}$ | BI |
|---|---|---|---|
| 0 | 0 | 0 | 1 |
|   |   | 1 | 2 |
|   | 1 | 0 | 3 |
|   |   | 1 | 4 |
| 1 | 0 | 0 | 5 |
|   |   | 1 | 6 |
|   | 1 | 0 | 7 |
|   |   | 1 | 8 |

For example, when (32,3) linear block codes that the existing LTE standard employs are applied, the terminal converts the BI into $[\tilde{q}_0^{BI}, \tilde{q}_1^{BI}, \tilde{q}_2^{BI}, \ldots, \tilde{q}_{31}^{BI}]$. Next, the terminal performs a circular repetition to operate the following Equation 4. Here, the last bit sequence may not be included.

$$[\tilde{q}_0^{BI}, q_1^{BI}, q_2^{BI}, \ldots, q_{31}^{BI}, q_0^{BI}, \ldots, q_{31}^{BI}, q_0^{BI}, \ldots] = [q_0^{BI}, q_1^{BI}, \ldots, q_{Q_{BI}-1}^{BI}] \quad \text{(Equation 4)}$$

The terminal defines $Q_{BI}' = Q_{BI}/Q_m$, $Q_{BI}' = Q_{BI}/Q_m$, $\hat{q}_i^{BI} = [\hat{q}_i^{BI}, \ldots, \hat{q}_i^{BI}]$ (repeat $N_L$ times) $\hat{q}_i^{BI} = [q_i^{BI}, q_{i+1}^{BI}, \ldots, q_{i+Q_z-1}^{BI}]$. In this case, $N_L$ represents the number of antenna ports used for the uplink data of the terminal. Next, the terminal uses a channel interleaver to multiplex $[q_0^{BI}, q_1^{BI}, \ldots, q_{Q_{31}-1}^{BI}]$ with data, where it is assumed that the base station knows the number of encoded bits, $Q_{BI}$, that depends on configurations to the terminal.

Method 620: Method for Separately Encoding B1 from R1 (Method for Independently Encoding BI from RI) when Only BI and RI Encoded by Feedback Subframe are Transmitted.

In the method 620, the BI may be encoded by the method for encoding RI of the LTE standard. When the BI is represented by n bits (n=1, 2, 3) (i.e., $[O_0^{BI}, \ldots, O_{n-1}^{BI}]$), the terminal encodes the BI according to the following Tables 1, 3, and 5. The method 620 may be applied to a PUCCH reporting.

In the case that the BI and RI are transmitted in the same subframe and that the encoded BI and RI are represented by n bits in total, the terminal generates a bit sequence of length n by concatenating the separately encoded BI and the RI. In the case that only the BI is transmitted in the subframe (that is, no RI is transmitted in the same subframe) and that the BI is represented by n bits, the terminal generates a bit sequence of length n. When the base station uses a normal cyclic prefix, the terminal applies a (20, n) linear block code to the bit sequence of length n, and then multiplexes HARQ-ACK. When the base station uses an extended cyclic prefix, the terminal multiplexes the HARQ-ACK (k bits, k=1 or 2) and then applies a (20, n+k) linear block code to the bit sequence of length n. When the terminal does not simultaneously transmit the HARQ-ACK with the RI and the BI, the terminal applies the (20, n) linear block code to the RI and the BI. Next, the terminal maps coded bits of length 20 to the feedback subframe.

Method 630: Method for Jointly Encoding BI and RI

The bit width occupied by the BI and the RI may be different depending on the maximum number of antenna ports configured to the terminal. To jointly encode the BI and the RI, the number of cases to a pair of BI and RI is enumerated and may be represented by a bit stream. Alternatively, the BI and the RI may be encoded into a bit sequence and two bit sequences may be concatenated. The terminal performs ordering a pair of BI and RI on the basis of a predetermined rule and assigns a number from 1 to K, where K represents all the number of cases to a pair B1 and RI. The following Tables 6, 7, 8, 9, and 10 each represent a relationship between the number of antenna ports and a pair of BI and RI.

TABLE 6

| $O_0$ | (BI, RI) |
|---|---|
| 0 | 1 |
| 1 | 2 |

TABLE 7

| $O_1$ | $O_2$ | (BI, RI) |
|---|---|---|
| 0 | 0 | 1 |
|   | 1 | 2 |
| 1 | 0 | 3 |
|   | 1 | 4 |

TABLE 8

| $O_0$ | $O_1$ | $O_2$ | (BI, RI) |
|---|---|---|---|
| 0 | 0 | 0 | 1 |
|   |   | 1 | 2 |
|   | 1 | 0 | 3 |
|   |   | 1 | 4 |

TABLE 8-continued

| $O_0$ | $O_1$ | $O_2$ | (BI, RI) |
|---|---|---|---|
| 1 | 0 | 0 | 5 |
|   |   | 1 | 6 |
|   | 1 | 0 | 7 |
|   |   | 1 | 8 |

TABLE 9

| $O_0$ | $O_1$ | $O_2$ | $O_3$ | (BI, RI) |
|---|---|---|---|---|
| 0 | 0 | 0 | 0 | 1 |
|   |   |   | 1 | 2 |
|   |   | 1 | 0 | 3 |
|   |   |   | 1 | 4 |
|   | 1 | 0 | 0 | 5 |
|   |   |   | 1 | 6 |
|   |   | 1 | 0 | 7 |
|   |   |   | 1 | 8 |
| 1 | 0 | 0 | 0 | 9 |
|   |   |   | 1 | 10 |
|   |   | 1 | 0 | 11 |
|   |   |   | 1 | 12 |

TABLE 10

| $O_0$ | $O_1$ | $O_2$ | $O_3$ | (BI, RI) |
|---|---|---|---|---|
| 0 | 0 | 0 | 0 | 1 |
|   |   |   | 1 | 2 |
|   |   | 1 | 0 | 3 |
|   |   |   | 1 | 4 |
|   | 1 | 0 | 0 | 5 |
|   |   |   | 1 | 6 |
|   |   | 1 | 0 | 7 |
|   |   |   | 1 | 8 |
| 1 | 0 | 0 | 0 | 9 |
|   |   |   | 1 | 10 |
|   |   | 1 | 0 | 11 |
|   |   |   | 1 | 12 |
|   | 1 | 0 | 0 | 13 |
|   |   |   | 1 | 14 |
|   |   | 1 | 0 | 15 |
|   |   |   | 1 | 16 |

Meanwhile, when the terminal does not use the feedback subframe but uses a subframe to transmit the CSI feedback information with a uplink data (for example, PUSCH reporting), the terminal may use a (32, k) linear block code (k=1, 2, 3, . . . ) to encode the BI along with the CQI and the PMI (method 400), where the linear block code is defined the existing LTE standard. Alternatively, when the terminal uses the feedback subframe to transmit the CSI feedback information (for example, PUCCH reporting), the terminal may use a (20, k) linear block code (k=2, 3, or 4) to encode the BI like the RI (method 410), where the linear block code is defined the existing LTE standard.

Method 232: Class B, K>1

In the method 232, the feedback subframe 1 includes the RI, the WB W1, and the BI. When the feedback periodicity of the BI is an integer multiple of the feedback periodicity of the RI, the feedback subframe 1 may include only the RI and WB W1. The feedback subframe 2 includes the WB CQI(s) and the WB W2. Comparing the feedback subframes of the periodic CSI feedback mode 1-1 and the sub mode 1 of the LTE standard to the feedback subframes in the method 232, in the feedback subframe 1, the BI is additionally transmitted. The terminal may use the following method 710 to encode the RI, WB W1, and BI, thereby generating the feedback subframe 1.

Method 710: Method for Encoding RI, WB W1, and BI.

In the method 710, when 8 antenna ports are configured for the RI and the WB W1 in terms of the CSI-RS resource, the terminal uses 5 bits on the basis of the LTE standard to jointly encode the R1 and the WB W1. When 4 antenna ports are configured for the RI and the WB W1 in terms of the CSI-RS resource, the terminal uses 5 bits on the basis of the LTE standard to jointly encode the R1 and the WB W1.

In this case, in the method 710, the terminal may convert the BI into the bit stream and concatenate the encoded RI and WB W1 to the converted bit stream. For example, if $[O_0^{BI}, \ldots, O_{Q_{BI}-1}^{BI}]$ and $I_{RI/PMI_1}=[O_0, \ldots, O_4]$ are concatenated to each other, $[[O_0^{BI}, \ldots, O_{Q_{BI}-1}^{BI}], I_{RI/PMI_1}]$ or $[I_{RI/PMI_1}, [O_0^{BI}, \ldots, O_{Q_{BI}-1}^{BI}]]$ may be obtained. Alternatively, the terminal may jointly encode the RI, the WB W1, and the BI. In this case, the order of the RI, the WB WI, and the BI may be kept unchanged. The number of bits for BI $Q_{BI}$ may be changed depending on the RI. The terminal may apply a (20, 5+$Q_{BI}$) linear block code to carry the encoded RI, WB W1, and BI on the feedback subframe, where the linear block code is defined in the existing LTE standard.

Method 233: Class B, K=1

In the method 233, the feedback subframe 1 includes the RI and the feedback subframe 2 includes the WB CQI(s) and the WB W2. The method 233 may be applied when the base station configures the terminal not to feedback the WB W1, where the unreported WB W1 is inferred by the base station in terms of the channel reciprocity from the reception of the terminal's uplink signal. Because K is 1, the terminal does not transmit the BI as a feedback, and only W2 (wideband $2^{nd}$ PMI), and WB CQI may be carried through the feedback subframe 2 to the base station. In this case, if the value of the RI reported by the terminal at the feedback subframe 1 is 1, the WB CQI may be represented by 4 bits, otherwise, i.e., the value of the RI is greater than 1, the WB CQI may be represented by 7 bits.

Figure 2:
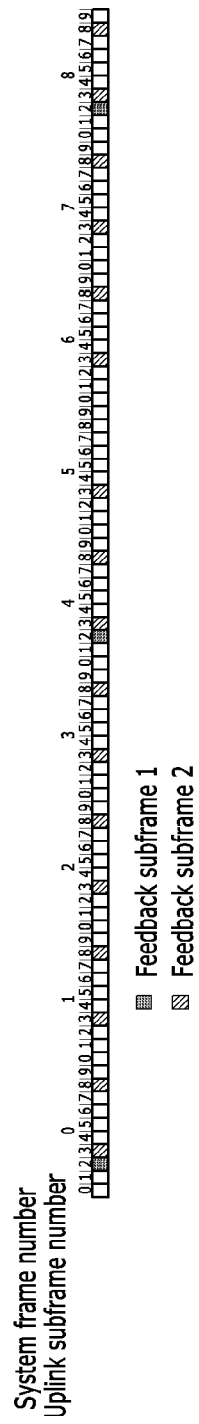
FIG. 2 is a diagram illustrating a feedback subframe transmitting a CSI report in which a double 2-dimensional CB is used, according to another exemplary embodiment.

FIG. 2 is a diagram illustrating a feedback subframe transmitting a CSI report in which a double 2-dimensional CB is used, according to another exemplary embodiment.

Referring to FIG. 2, the CSI report includes the wideband CQI and the single PMI and are periodically transmitted through two distinct feedback subframes. Each feedback subframe may be transmitted at different periodicities and in different priorities. Referring to FIG. 2, the feedback subframe 1 has the longest periodicity and the highest priority and the periodicity of the feedback subframe 2 is 5 subframes. The feedback subframe 1 and the feedback subframe 2 illustrated in FIG. 2 may be used in the above methods 231, 232, and 233.

Meanwhile, in the present disclosure, the base station may configure the two CSI reports in the terminal. When the terminal observes radio channels between the terminal and a first base station and between the terminal and a second base station, the terminal transmits the CSI report to the first base station. In this case, a first CSI process corresponds to the radio channel between the first base station and the terminal and a second CSI process corresponds to the radio channel between the second base station and the terminal. A reference CSI process correlates a relationship between the first CSI process and the second CSI process. When the base station configures the first CSI process as the reference CSI process to the second CSI process in the terminal, the operation of the terminal will be described below.

When the terminal uses the method 200 to transmit the feedback information to the base station, if the CSI components (i.e., RI) included in the feedback subframe 1 of the first CSI process and the second CSI process the terminal are the same, the terminal may apply the RI-reference CSI process of the LTE standard.

If the CSI components (i.e., RI, WB PMI_1, WB PMI_2-1) included in the feedback subframe 1 and the feedback subframe 2 of the first CSI process and the CSI components included in the feedback subframe 1 and the feedback subframe 2 of the second CSI process are the same, the terminal may use the CSI components (i.e., CQI, WB PMI_2-2) included in the feedback subframe 3 to distinguish the two CSI processes. In this case, the RI, the WB PMI_1, and the WB PMI_2-1 are the same, and therefore it may be considered that the first base station and the second base station to which the CSI process is allocated are located closely. Such network deployment is inefficient in coverage, and therefore the terminal to which the method 200 is applied may consider an RI-reference CSI process of the LTE standard. For the similar reason for the case of the method 200, the method 205 may also consider the RI-reference CSI process.

In the terminal using the method 210, if the CSI components (i.e., RI and WB PMI_1-1) included in the feedback subframe 1 of the first CSI process and the second CSI process, respectively, are the same, the terminal has a (RI+WB PMI_1-1)-reference CSI process. That is, in this case, the reference CSI process that is applied to the terminal is not the RI-reference CSI process of the LTE standard. The case that the feedback subframe 1 and the feedback subframe 2 of two different CSI processes (i.e., first CSI process and second CSI process) to the terminal can imply that such network coverage is significantly limited. Therefore, the method 210 may consider a (RI+WB PMI_1-1)-reference CSI process. For the similar reason for the case of the method 210, the method 215 may also consider a (RI+WB V1)-reference CSI process. Further, for the similar reason to the methods 210 and 215, the method 231 may also consider a (RI+BI)-reference CSI process having a relationship referencing the RI+B1 included in the feedback subframe 1.

A method for transmitting, by a terminal, feedback information including the UE-selected subband CQI and a single PMI report will be described below.

In the present disclosure, the terminal generates a WB CQI and an SB CQI. To distinguish the WB CQI and the SB CQI, a precoding type indicator (PTI) defined by 1 bit is used. When the PTI is 1 (PTI=1), the terminal transmits the feedback information including both of the SB CSI report and the WB CSI report to the base station and when the PTI is 0 (PTI=0), the terminal transmits the feedback information including only the WB CSI report to the base station. The terminal may multiplex the PTI and the RI and carry the multiplexed PTI and RI on the same feedback subframe. If the terminal observes a change in the WB CSI, when the feedback subframe including the RI and the PTI is generated, the value of the PTI is set to 0. When the terminal determines the CSI component (e.g., PMI segment) that will be included in a specific feedback frame, the terminal may follow the latest reported PTI among the plurality of PTIs transmitted previously to the base station.

Hereinafter, one PMI has two PMI components (double CB), in which each PMI component has two or less than two PMI segments (2-dimensional CB). That is, the terminal uses at least three distinct feedback subframes to complete one CSI report transmitting the feedback information on four or less than four PMI segments.

When one CSI report includes the plurality of feedback subframes, each feedback subframe may be chosen with respect to on the predetermined priority and transmitted. For example, when three feedback subframes are used, the priority of each feedback subframe may be "feedback subframe 1>feedback subframe 2>feedback subframe 3". In this case, the feedback subframe having relatively higher priority may include the PMI segment having longer periodicity and the feedback subframe having lower priority may include the PMI segment having shorter periodicity. The feedback subframe having the lowest priority may include the CQI and the feedback subframe having the highest priority may include the RI or the PMI. In this case, the base station may configure the periodicity and the subframe offset of the feedback subframe having different priorities to the terminal.

A method for reporting, by a terminal, CQI to a base station through a transmission of feedback subframe in three times will be described below. Hereinafter, a bandwidth part (BP) is a frequency part where the entire system bandwidth is divided depending on a predetermined rule and can be considered as a set of subbands. One subband is included only in one BP and each of subbands are included in at least one BP. Hereinafter, the subband means a group of at least one resource block.

Hereinafter, the terminal may generate the SB CSI reports for each BP and use the feedback channel to transmit the generated SB CSI report to the base station. In this case, the reporting rule of the SB CSI report may be defined in the existing LTE standard. Further, three distinct feedback subframes may have different periodicities and different priorities. The terminal may transmit one feedback subframe in one uplink subframe. The CSI component included in each feedback subframe may be determined on the basis of the following methods 300, 310, 320, and 321.

Method 300: Class A

In the method 300, the feedback subframe 1 includes the R1, the PTI, and the WB PMI_1-1. When the PTI included in the feedback subframe 1 is 1 (PTI=1), feedback subframe 1-2 includes the WB PMI_1-2 and the WB PMI_2-1 and feedback subframe 1-3 includes an SB CQI(s), an SB PMI_2-2, and an SB index. When the PTI included in the feedback subframe 1 is 0 (PTI=0), the feedback subframe 0-2 includes the WB PMI_1-2 and the WB PMI_2-1 and the feedback subframe 0-3 includes the WB CQI(s) and the WB PMI_2-2. That is, in the method 300, the feedback subframes 2 and 3 may change the CSI components included therein depending on the last reported PTI of the feedback subframe 1.

In the method 300, the feedback subframe 1 may further include one PMI segment (e.g. WB PMI_1-1) by adding to the RI and the PTI. When the terminal generates the WB PMI_1-1 in 4 bits or less, the terminal may transmit up to 8 bits (3 bits as RI+1 bit as PTI+4 bits as WB PMI_1-1) by using the feedback subframe 1.

The CSI component included in the feedback subframe may be changed depending on the PTI value that the terminal reports. When the PTI is reported as 1, the terminal generates the feedback subframe 1-2 including the WB PMI_1-2 and the WB PMI_2-1, and generates the feedback subframe 1-3 including the WB PMI_2-2 and the SB CQI(s). In this case, each of WB PMI_1-2 and the WB PMI_2-1 included in the feedback subframe 1-2 may be represented by 4 bits or less. Therefore, the feedback subframe 1-2 may map up to 8 bits (that is, 4 bits+4 bits). The feedback subframe 1-2 may be transmitted at higher priority than the feedback subframe 1-3 and may have longer periodicity. The base station may configure a relative ratio of the periodicity of the feedback subframe 1-2 and the periodicity of the feedback subframe 1-3 to the terminal. When the PTI is reported as 1 and when it comes to transmit in the first time without the last reported WB PMI(s), the feedback subframe 1-3 may correspond to predetermined SB in the standard, where the SB is included in a BP. For example, the chosen SB may correspond to the SB with the lowest index in the BP. The terminal selects the SB having the largest CQI in the BP, and thus may have an advantage in the downlink throughput. The SB index selected by the terminal may also be included in the feedback subframe 1-3. The SB CQI(s) can be represented by 4 bits when the RI is 1 and by 7 bits when the RI is larger than 1. The SB index may be represented by up to 2 bits depending on the system bandwidth. Therefore, the number of bits that may be allocated to the SB PMI_2-2 may be "maximum payload in the PUCCH format 2" minus 6 bits (that is, 4-bit+2-bit) when the RI is 1 in the case in which the PUCCH format 2 is used and may be "maximum payload in the PUCCH format 2" minus 9 bits (that is, 7-bit+2-bit) when the RI is larger than 1, i.e., RI≥2. If the maximum payload in the PUCCH format 2 is 11 bits, when RI=1, the terminal may sub-sample the SB PMI_2-2 at 5 bits or less and when RI>1, the terminal may sub-sample the SB PMI_2-2 at 2 bits or less.

When the PTI is 0 (PTI=0), the terminal reports the WB CQI(s) and the WB PMI(s) to the base station. The feedback subframe 0-2 transmitted when PTI=0 includes the WB PMI_1-2 and the WB PMI_2-1 of 4 bits or less. Therefore, the number of bits in the feedback subframe 0-2 may be up to 8 bits (4 bits+4 bits). The feedback subframe 0-2 transmitted when PTI=0 has higher priority than that of the feedback subframe 0-3. Further, the relative ratio of the periodicity of the feedback subframe 0-2 and the periodicity of the feedback subframe 0-3 depends on the configured value to the terminal by the base station. At the feedback subframe 0-3, the WB CQI(s) may be up to 7 bits depending on the RI and the WB PMI_2-2 may be represented by up to 4 bits depending on the RI. Therefore, the feedback subframe 0-3 may carry up to 11 bits (7 bits+4 bits).

In the method 300, as one example of the 2-dimensional CB, the 2-dimensional CB may be decomposed into the vertical CB and the horizontal CB. In this case, the PMI_1 and the PMI_2 may each correspond to the vPMI and the hPMI, and the vertical CB and the horizontal CB have the double CB structure and therefore the PMI segment may correspond to the $1^{st}$ PMI or the $2^{nd}$ PMI. Alternatively, the PMI_1 may correspond to the $1^{st}$ PMI and the PMI_2 may correspond to the $2^{nd}$ PMI. In this case, the PMI_1 may be devided into the PMI_1-1 and the PMI_1-2, and the partitioned PMIs may correspond to the vPMI and hPMI, or hPMI and vPMI, respectively. The PMI_2 may have a beam selection component and a co-phase component, and if necessary, the PMI_2 may be divided into the PMI_2-1 and the PMI_2-2, so that the beam selection component and the co-phase component may be allocated to the PMI_2-1 and the PMI_2-2, respectively. In this case, the PMI_2-1 may not have the co-phase component.

In the following method 310, the WB H2 and the SB H2 may each include the beam selection component and the cophase component or may include only the cophase component and the WB V2 may include the beam selection component without the cophase component.

Method 310: Class A

In the method 310, the feedback subframe 1 includes the R1, the PTI, and the WB V1. When the PTI included in the feedback subframe 1 is 1 (PTI=1), the feedback subframe 1-2 includes the WB H1 and the SB V2 and the feedback subframe 1-3 includes the SB CQI(s), the SB H2, and the SB index. When the PTI included in the feedback subframe 1 is 0 (PTI=0), the feedback subframe 0-2 includes the WB H1 and the WB V2, or the WB H1 and a BP V2, and the feedback subframe 0-3 includes the WB CQI(s) and the WB H2. In this case, the BP V2 means a V2 derived in the considered bandwidth part (BP) by the terminal.

When the feedback subframe 1 includes the RI and the PTI, more than two feedback subframes are required in order to transmit V1, V2, H1, and H2. In this case, three feedback subframes or more feedback subframes are necessary, which may restrict the CSI feedback operation if the channel coherence time is short. Therefore, in the method 310, the feedback subframe 1 can further include the WB V1. The case in which the WB V1 is changed corresponds to the case in which the terminal moves in a vertical direction. Generally it is known that the in-door terminal rarely moves vertically and the outdoor terminal also has substantially rare mobility in the vertical direction. The RI may be represented by 3 bits when the terminal receives layers that are equal to or less than 8 and the PTI is represented by 1 bit. The number of bits for the WB V1 may be determined as the number of V1 in the configured 2-dimensional CB to the terminal. In this case, the number of bits for V1 may be determined depending on the RI. When the WB V1 can be represented by 4 bits, the maximum payload in the feedback subframe 1 is 8 bits (3 bits+1 bit+4 bits) and the PUCCH format 2 of the LTE standard may be used.

The number of bits of the WB H1 and the WB V2 included in the feedback subframe 1-2 may be changed depending on the 2-dimensional CB and the maximum number of antenna ports that are configured to the terminal. When the WB H1 and the WB V2 are limited to up to 4 bits, the maximum number of CSI bits in the feedback subframe 1-2 is 8 bits and the PUCCH format 2 of the LTE standard may be used. Meanwhile, when the feedback subframe 1-3 includes the SB H2 and the SB V2 assumed for the terminal to derive the SB CQI(s), the number of CSI bits may exceed the capacity of the PUCCH format 2 in the LTE standard. Therefore, the SB V2 is included in the feedback subframe 1-2. In this case, the feedback subframe 1-2 may include the WB H1, the WB V2, and the SB V2 (or BP V2).

The feedback subframe 1-3 includes the SB CQI, and when RI=1, the SB CQI is represented by 4 bits and when RI>1, the SB CQIs is represented by 7 bits. When RI>1, the feedback subframe 1-3 includes the SB CQI of 4 bits and the SB spatial differential CQI of 3 bits. Therefore, when RI>1, SB CQIs (SB CQI and SB spatial differential CQI) require 7 bits. The SB index is a local index representing the SB selected by the terminal within the considered BP and its bitwidth is changed depending on the system bandwidth within up to 2 bits. The number of bits for the SB H2 can be up to the maximum payload of the PUCCH format 2 minus 6 bit (4 bits+2 bits) (when RI=1) or 9 bits (7 bits+2 bits) (when RI>1). The maximum allowable payload of the PUCCH format 2 in the LTE standard is known to be 11 bits, but generally, the base station supporting the elevation beamforming (EBF) with a large number of antennas has better receiving performance of the feedback information. In this case, the terminal may transmit the feedback information of 12 or 13 bits to the base station without greatly affecting the feedback coverage in terms of a block error rate (BER).

Meanwhile, at the feedback subframe 1-3, the SB H2 may not be represented by 4 bits. When RI=1, the feedback subframe 1-3 does not include the SB spatial differential CQI but includes the SB $2^{nd}$ PMI of 4 bits. However, when RI>1, the feedback subframe 1-3 includes the SB spatial differential CQI and also includes the sub-sampled SB $2^{nd}$ PMI of 2 bits. Thus, the SB H2 can be represented by 2 bits if the feedback subframe 1-3 has the maximum payload of 11 bits.

The feedback subframe 0-2 includes the CSI components that are not included even in the feedback subframe 1 and are not transmitted through the same feedback subframe as the WB CQI(s). For example, the feedback subframe 0-2 includes the WB H1 and WB V2. The WB H1 and the WB V2 may be up to 4 bits and may be changed depending on the reported RI and the 2-dimensional CB configured to the terminal. When each of the WB H1 and the WB V2 are limited to 4 bits, the feedback subframe 0-2 loads up to 8 bits (4 bits+4 bits) and therefore the PUCCH format 2 of the LTE standard may be used.

The feedback subframe 0-3 includes the WB CQI(s) and the WB W2. The WB CQI(s) occupies 4 bits when RI=1 and is 7 bits when RI>1 and may be changed depending on the reported RI and the 2-dimensional CB configured to the terminal. To use the PUCCH format 2 in the LTE standard for the feedback subframe 0-3, the maximum payload of the feedback subframe 0-3 may be limited to 11 bits. Therefore, when RI=1, up to 7 bits may be allocated to the WB H2 and when RI>1, up to 4 bits may be allocated to the WB H2.

Method 311: Class A

In the method 311, the feedback subframe 1 includes the R1, the PTI, and the WB V1. When the PTI included in the feedback subframe 1 is 1 (PTI=1), the feedback subframe 1-2 includes the WB H1 and the feedback subframe 1-3 include the SB CQI(s), the SB H2, and the SB index. When the PTI included in the feedback subframe 1 is 0 (PTI=0), the feedback subframe 0-2 includes the WB H1 and the feedback subframe 0-3 includes the WB CQI(s) and the WB H2. In the method 311, the V2 of the method 310 is omitted. In the method 311, the beam selection in the vertical and horizontal directions and the cophase between different polarizations may be performed based on the reported WB H2.

Method 315: Class A

In the method 315, when the PTI included in the feedback subframe 1-1 is 1 (PTI=1), the feedback subframe 1-1 includes the RI, the PTI, and the WB V1 and the feedback subframe 1-2 includes the WB CQI(s), the WB H1, and the WB H2. When the PTI included in the feedback subframe 0-1 is 0 (PTI=0), the feedback subframe 0-1 includes the RI, the PTI, and the WB H1 and the feedback subframe 0-2 includes the WB CQI(s) and the WB W2 and the feedback subframe 3 includes the SB CQI(s), the SB W2, and the SB index. In the method 315, the PTI controls the vPMI and the hPMI. The base station may distinguish whether the received feedback subframe is the feedback subframe 1-1 or the feedback subframe 0-1 depending on the PTI. When the base station recognizes the PTI as 1, the base station regards succeeding feedback subframes as the feedback subframe 1-2 and the feedback subframe 3. When the base station recognizes the PTI as 0, the base station regards succeeding feedback subframes as the feedback subframe 0-2 and the feedback subframe 3. In the method 315, the terminal may always transmit the SB CQI to the base station. The W2 performs the beam selection and the co-phase between polarizations regardless of horizontal or vertical dimensions.

Method 316: Class A

In the method 316, the feedback subframe 1 includes the R1 and the PTI. When the PTI included in the feedback subframe 1 is 1 (PTI=1), the feedback subframe 1-2 includes the WB CQI(s) and the WB W2 and the feedback subframe 1-3 includes the SB CQI(s), the SB W2, and the SB index. In the method 316, when the PTI is 0 (PTI=0), the feedback subframe 0-1 includes the WB V1 and the WB H1 and the feedback subframe 0-2 includes the WB CQI(s) and the WB W2. In the method 316, the terminal may report the WB CQI and the SB CQI to the base station when PTI=1, and may report only the WB CQI to the base station when the PTI is 0 (PTI=0). At the feedback subframe 0-1, to generate the WB V1 and the WB H1 within 11 bits or so, the appropriate CB sub-sampling may be applied. The W2 performs the beam selection and the co-phase between polarizations regardless of horizontal or vertical dimensions.

Method 320: Class B, K>1

In the method 320, the feedback subframe 1 includes the RI, the PTI, and the BI. Alternatively, when the feedback periodicity of the BI is an integer multiple of the feedback periodicity of the R1, the feedback subframe 1 may include only the RI and PTI. When the PTI included in the feedback subframe 1 is 1 (PTI=1), the feedback subframe 1-2 includes the WB CQI(s) and the WB H2 and the feedback subframe 1-3 includes the SB CQI(s), the SB H2, and the SB index. When the PTI is 0 (PTI=0), the feedback subframe 0-2 includes the WB H1 and the feedback subframe 0-3 includes the WB CQI(s) and the WB H2. In the method 320, the CQI may be delivered via the feedback subframe 1-2. When the PTI=0, the feedback subframe 0-2 and the feedback subframe 0-3 may each include one PMI segment. To encode the RI, the PTI, and the BI included in the feedback subframe 1, methods 510 or 520 to be described below may be applied.

Method 321: Class B, K=1

In the method 321, the feedback subframe 1 includes the R1, the feedback subframe 2 includes the WB CQI(s) and the WB W2, and the feedback subframe 3 includes the SB CQI(s), the SB W2, and the SB index. The method 321 shows the case in which K=1, and therefore the feedback subframe does not include the BI and the terminal report the WB precoding to the base station. The method 321 may be applied when the base station configures the terminal not to transmit the WB W1 as the feedback information to the base station. The base station can infer the WB W1 by using the terminal's uplink signal in the principle of the channel reciprocity.

At K=1, the terminal does not report the WB precoding to the base station, and therefore the CSI feedback does not require a PTI. That is, the precoding for the terminal may be determined as RI and W2 in the chosen BI. The terminal reports the SB precoding and the WB precoding to the base station.

When the base station configures a 1-1-th CSI process as the reference CSI process of a 1-2-th CSI process to the terminal, the operation of the terminal will be described below.

According to the method 300, if the CSI components (i.e., RI) included in the feedback subframe 1 transmitted from the terminal are the same in the 1-1-th CSI process and the 1-2-th CSI process, the RI-reference CSI process of LTE standard may be applied.

If the CSI components (i.e., RI, PTI, WB PMI_1-1, WB PMI_1-2, WB PMI_2-1) in the feedback subframe 1 and the feedback subframe 2 in the 1-1-th CSI process transmitted from the terminal and the CSI components included in the feedback subframe 1 and the feedback subframe 2 transmitted from the terminal in the 1-2-th CSI process are the same, the terminal uses the CSI components (e.g., CQI, PMI_2-2)) included in the feedback subframe 3 to distinguish the 1-1-th CSI process and the 1-2-th CSI process. If it is considered that "RI, WB PMI_1-1, WB PMI_1-2, and WB PMI_2-1" are the same, the first base station and the second base station to which the CSI process is allocated needs to be closely deployed. This is impractical, and therefore in the method 300, a (RI+PTI+WB PMI_1-1)-reference CSI process may be considered. Alternatively, the (RI+WB PMI_1-1)-reference CSI process may be considered.

The description applied to the method 300 may also be applied to the method 310. If the CSI components (i.e., RI, PTI, WB V1) included in the feedback subframe 1 of the 1-1-the CSI process and the 1-2-th CSI process are the same, instead of the RI-reference process of the LTE standard, a (RI+PTI+WB V1)-reference CSI process may be considered. Applying the two CSI processes (i.e., 1-1-th CSI process and 1-2-th CSI process) for the feedback subframe 1 and the feedback subframe 2 having the same CSI components to the terminal is the network coverage can be limited. Therefore, in the method 310, the (RI+PTI+WB PMI_1-1)-reference CSI process may be considered. Likewise, the (RI+WB VI)-reference CSI process may also be considered.

The foregoing description may be applied even to the methods 320 and 321 as it is, and (RI+PTI+BI)-reference CSI process or the (RI+BI)-reference CSI process may be considered as well.

Figure 3A:
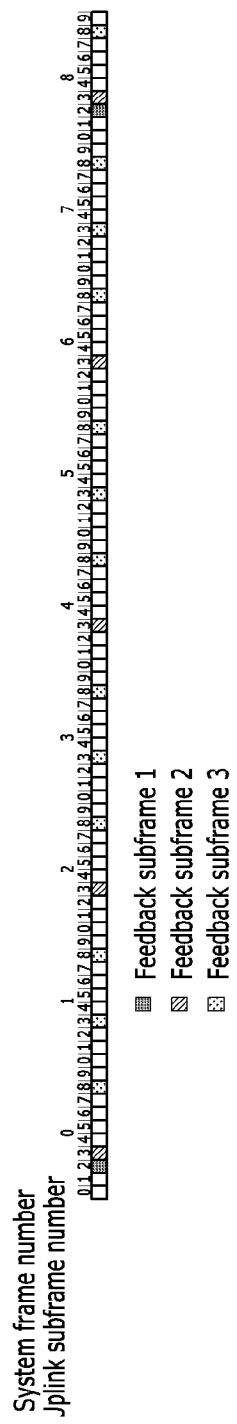
FIGS. 3A and 3B are diagrams illustrating a feedback subframe transmitting a CSI report in which a double 2-dimensional CB is used, according to another exemplary embodiment.
Figure 3B:
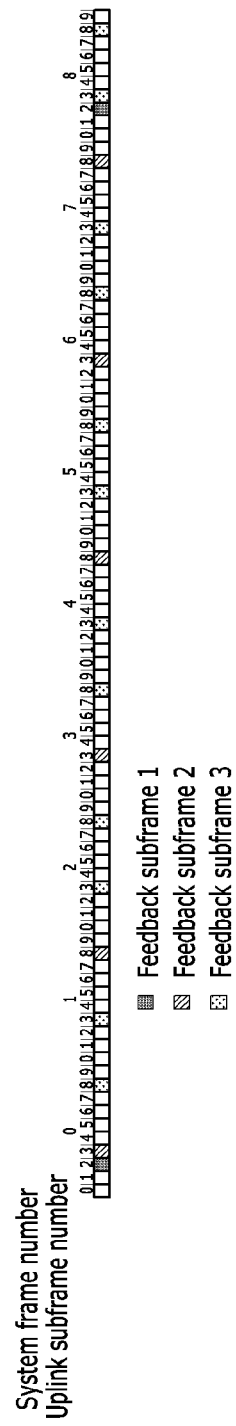

FIGS. 3A and 3B are diagrams illustrating a feedback subframe transmitting a CSI report in which a double 2-dimensional CB is used, according to another exemplary embodiment.

Referring to FIG. 3A and FIG. 3B, when the PTI of the feedback subframe 1 is 1, the feedback subframe 1-2 and the feedback subframe 1-3 are transmitted and when the PTI of the feedback subframe 1 is 0, the feedback sub frame 0-2 and the feedback subframe 0-3 are transmitted. The periodicity of the feedback subframe 1-2 is 20 subframes and the periodicity of the feedback subframe 1-3 is 5 subframes. Since the priority of the feedback subframe 1-2 is higher than that of the feedback subframe 1-3, when the two feedback subframes are to be transmitted in the same uplink subframe, the feedback subframe 1-2 is transmitted. The periodicity of the feedback subframe 0-2 is 15 subframes, the periodicity of the feedback subframe 0-3 is 5 subframes, and the priority of the feedback subframes 0-2 is higher than that of the feedback subframe 0-3. The feedback subframe 1, the feedback subframe 1-2, the feedback subframe 1-3, the feedback subframe 0-2, and the feedback subframe 0-3 illustrated in FIGS. 3A and 3B may be used in the methods 300, 310, and 320.

When the base station configures the double CB in the terminal and configures the periodic subband feedback mode, the terminal may alternately perform the wideband feedback and the subband feedback. In this case, when the terminal feeds back the subband PMI, the terminal encodes the RI, the PTI, and the BI and feeds back the encoded RI, PTI, and BI to the base station using the feedback subframe. In this case, a periodic CSI reporting mode 2-1 of the LTE standard may be applied.

Method 510: Method for Encoding BI and RI (Jointly Encoded BI and RI), and PTI In the method 510, the terminal may acquire the bit stream represented by $[O_0, O_1, \ldots, O_{Q-1}]$ by the jointly encoding of the RI and the BI and may acquire $[[O_0, O_1, \ldots, O_{Q-1}], O_{PTI}]$ by concatenating 1 bit representing the PTI. In this case, the joint encoding BI and RI can employ the Method 610, or Method 620, or Method 630. Next, the terminal uses the (20, Q+1) linear block code to generate and modulate the encoded bits corresponding to 20 bits, where the linear block code is defined in the existing LTE standard.

Method 520: Method for Encoding BI, PTI, and RI

In the method 520, the terminal encodes the bit stream in which the RI and the PTI are concatenated, and concatenates the encoded BI to the encoded RI and RTI In this case, the order of the RI, the PTI, and the BI may be changed and the order of the RI bit stream and the BI bit stream may be internally preserved. For example, according to the method 520, the terminal may concatenate the BI next to $[[O_0^{RI}, \ldots, O_{Q_{RI}-1}^{RI}], O_{PTI}]$ to generate $[[[O_0^{RI}, \ldots, O_{Q_{RI}-1}^{RI}], O_{PTI}], O_0^{BI}, O_1^{BI}, \ldots, O_{Q_{RI}-1}^{BI}]$, or may concatenate the BI before $[[O_0^{RI}, \ldots, O_{Q_{RI}-1}^{RI}], O_{PTI}]$ to generate $[O_0^{RI}, O_1^{RI}, \ldots, O_{Q_{RI}-1}^{RI}, [[O_0^{RI}, \ldots, O_{Q_{RI}-1}^{RI}], O_{PTI}]]$. Next, the terminal uses the (20, $Q_{RI}+1+Q_{BI}$) liner block code to generate and modulate the encoded bits corresponding to 20 bits, where the linear block code is defined in the existing LTE standard.

Meanwhile, the CSI report may be multiplexed with the uplink data (e.g., physical uplink shared channel (PUSCH)). When the wideband CQI and the single PMI report or the UE-selected subband CQI and the single PMI report are performed by the terminal based on the LTE standard, the terminal may perform the following operation.

First case: Case in which terminal performs periodic CSI feedback

Second case: Case in which base station instructs terminal to transmit uplink data Third case: Case in which base station instructs terminal to perform CSI feedback Fourth case: Case in which terminal transmits HARQ ACK to base station The first case corresponds to the case in which the terminal transmits the wideband CQI and the single PMI report or the UE-selected subband CQI and the single PMI report to the base station. If the first case and the second case are simultaneously considered, the terminal independently encodes (channel encoding) the CSI feedback information and data, and allocates the encoded CSI feedback information and data to different REs. In this case, the encoding procedure and the RE mapping may follow the LTE standard. If the first case and the third case are simultaneously considered, the terminal transmits only the HARQ ACK and may use PUCCH format 1, PUCCH format 1a, or PUCCH format 1b. If the first case, the second case, and the third case are simultaneously considered, the terminal independently encodes the CSI, the HARQ ACK, and data and transmits them.

When the terminal reports the BI to the base station (e.g., class B CSI process, or the like), the single BI may be transferred through the wideband CQI and single PMI report, the UE-selected subband CQI and single PMI report as the feedback information. Further, the single BI is applied to the wideband. A method for transmitting BI will be described below with the methods 400, 410, and 420.

Method 400: Method for Encoding BI Along with CQI and PMI

Figure 4:
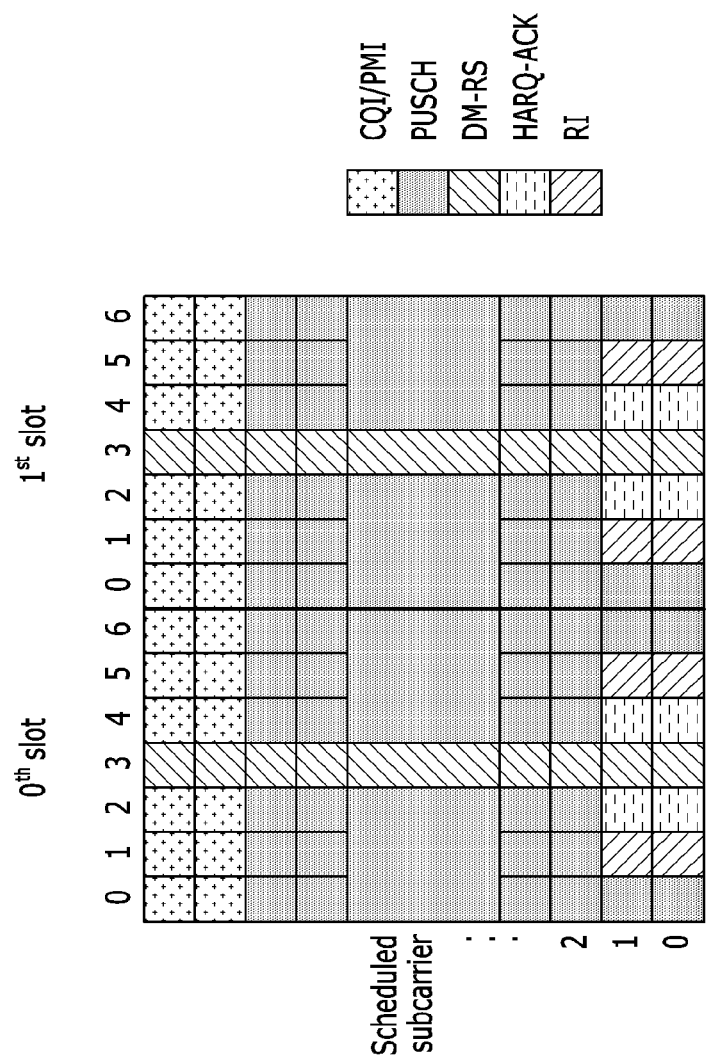
FIG. 4 is a diagram illustrating an RE mapping table according to one exemplary embodiment.

In the method 400, the BI is encoded similarly to the CQI and the PMI, and the encoded BI may be closely mapped to REs to which the encoded CQI and PMI are mapped. Referring to FIG. 4, the CQI and the PMI are mapped to REs corresponding to two subcarriers at an upper part of the resource block (RB) (except for REs to which demodulation reference signal (DM-RS) is mapped). In this case, the BI is treated more important than the CQI and the PMI, and therefore the BI is encoded at lower rate than that of the CQI and the PMI and then may be concatenated to the CQI and the PMI. The terminal performs RE mapping by using concatenated coded bits, following the LTE standard. Further, a modulation and coding scheme (MCS) offset for the BI may be the same as the MCS offset for the RI.

Method 410: Method for Encoding BI Similar to RI

Figure 5:
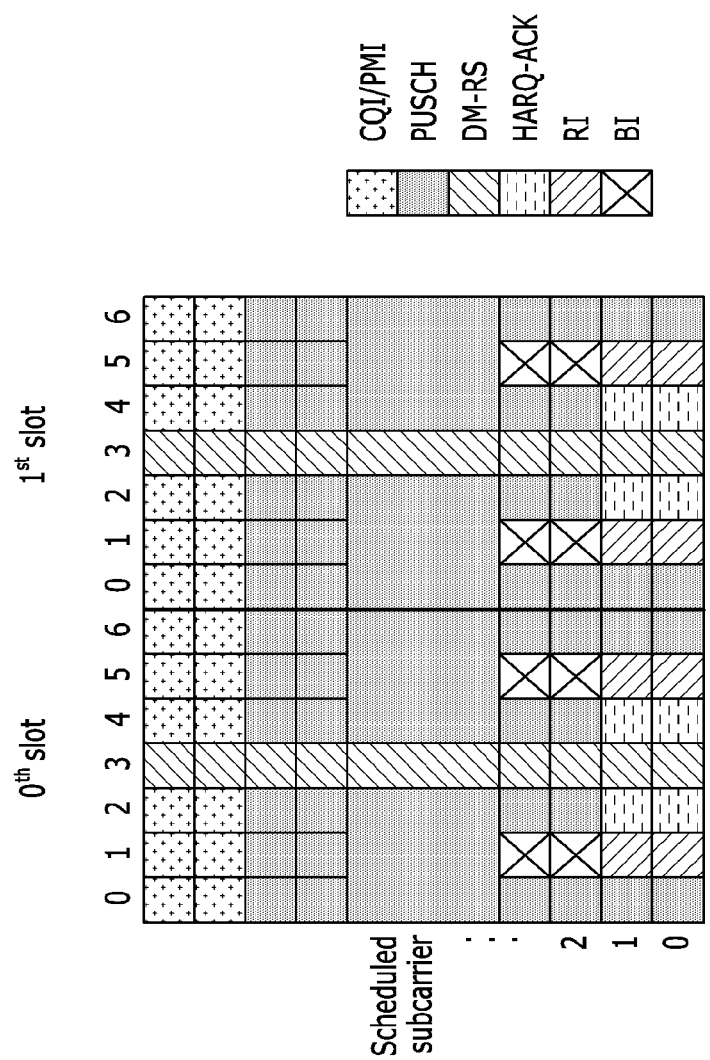
FIG. 5 is a diagram illustrating an RE mapping table according to another exemplary embodiment.

In the method 410, the BI and the RI are identically encoded and referring to FIG. 5, the encoded BI and the encoded RI are mapped in the same symbol with different subcarriers. In FIG. 5, the RI is located under the BI but BER performance is never affected even when the locations of the RI and the BI are changed. However, when the RE mapping for RI is used as the LTE standard, the BI may be located above the RI in terms of subcarrier indices. The RE mapping for the encoded BI will be described in the following methods 410-1 and 410-2.

Method 410-1: Method for Mapping Encoded BI Before PUSCH RE Mapping (PUSCH Rate Matching).

In the method 410-1, the encoded BI is mapped prior to PUSCH RE mapping, and therefore the PUSCH is mapped to the RE to which the encoded BI is not mapped. In this case, the encoding rate of the PUSCH may be increased.

Method 410-2: Method for Mapping Encoded BI after PUSCH RE Mapping (PUSCH Puncturing).

In the method 410-2, the encoded BI overrides the RE mapped PUSCH. When the base station decodes the PUSCH, the RE to which the encoded BI is mapped does not use PUSCH decoding.

Method 420: Method for Encoding BI Similarly to HARQ-ACK

Figure 6:
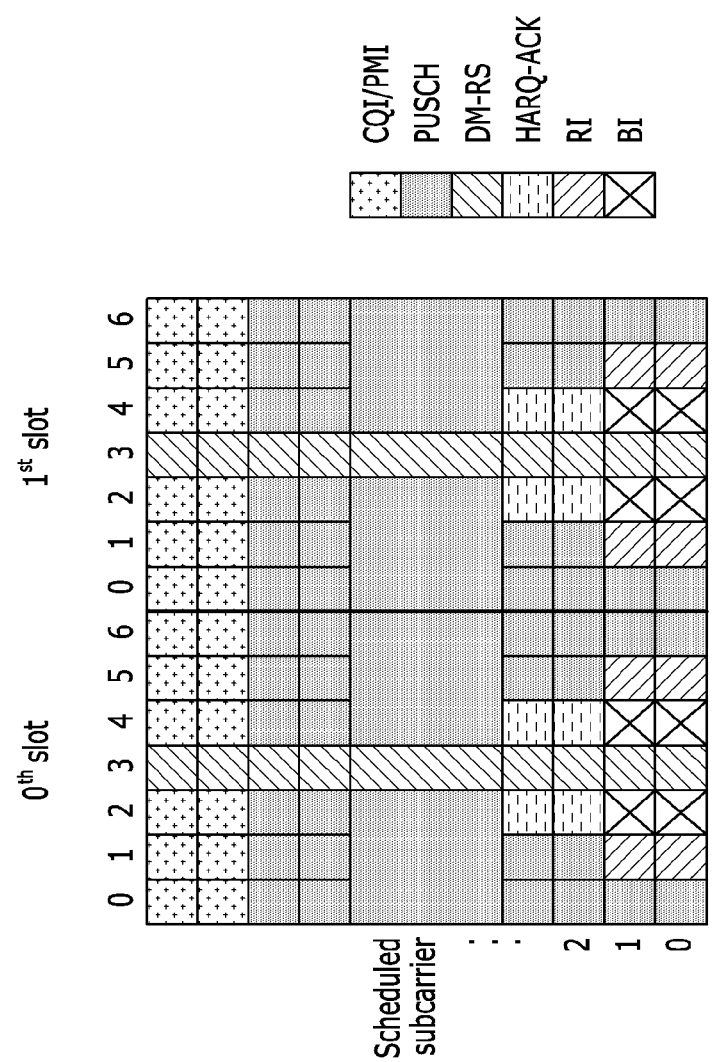
FIGS. 6 to 8 are diagrams illustrating an RE mapping table according to another exemplary embodiment.
Figure 7:
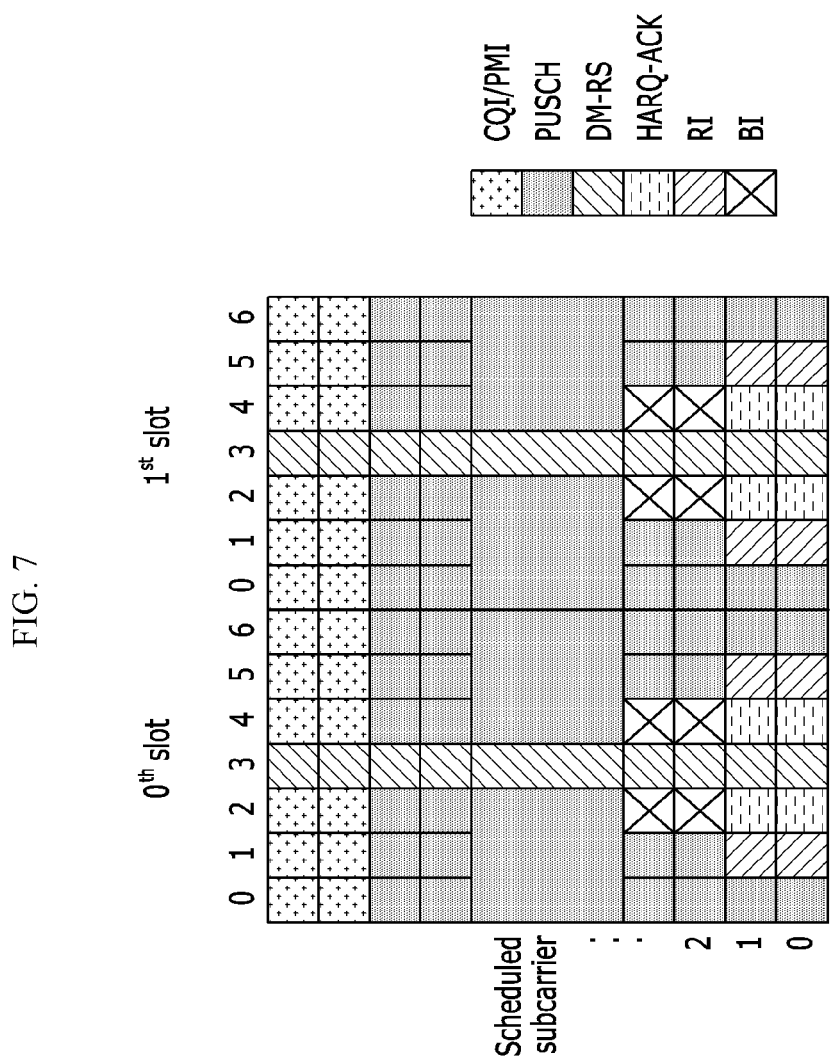

In the method 420, the BI is encoded by the same method to the RI, and referring to FIGS. 6 and 7, the encoded BI and the encoded HARQ-ACK are mapped in the same symbol with different subcarriers. The subcarrier indices for BI or for HARQ ACK does not affect the BER performance. The Method 420 may be further clarified by the methods 420-1 and 420-2.

Method 420-1: Case in which Encoded BI is Mapped to Lower Subcarrier Indices in the Scheduled Resources and Encoded HARQ-ACK is Mapped to Higher Subcarrier Indices in the Scheduled Resources The BI is one element of the periodic CSI feedback and the terminal may determine the uplink subframe at which the BI will be transmitted in advance but the presence of HARQ-ACK may not be known before the downlink scheduling assignment is received from the base station, e.g., 4 ms. Therefore, in the method 420-1, referring to FIG. 6, the encoded BI is first mapped, and then the encoded HARQ-ACK may be mapped in the same symbol with different subcarriers. The method 420-1 may be applied with the PUSCH rate matching (method 410-1) and the PUSCH puncturing (method 410-2), respectively. When the PUSCH rate matching is applied, the encoded BI is first mapped ahead of the PUSCH and then the RE occupied by the encoded BI upon the PUSCH RE mapping is not used. Finally, the RE mapping of the encoded HARQ-ACK may be performed avoiding the RE occupied by the encoded BI. When the PUSCH puncturing is applied, the PUSCH RE mapping is performed and then the RE mapping of the encoded BI is performed, and therefore the encoded BI is re-allocated to the RE to which the PUSCH is allocated. Finally, the RE mapping of the encoded HARQ-ACK may be performed avoiding the RE occupied by the encoded BI.

Method 420-2: Case in which Encoded BI is Mapped to Higher Subcarrier Indices in the Scheduled Resources and Encoded HARQ-ACK is Mapped to Lower Subcarrier Indices in the Scheduled Resources In the case of the method 420-2, the HARQ-ACK RE mapping depending on the LTE standard may be used. Referring to FIG. 7, the encoded HARQ-ACK is located in the same symbol with different subcarrier indices compared to the encoded BI. The methods 410-1 and 410-2 for performing the RE mapping of the RI may be considered. In the method 420-2, the terminal determines the transmission of the HARQ-ACK after receiving the downlink scheduling assignment from the base station and then performs the RE mapping of the encoded BI. The RE mapping of the PUSCH is first performed and then the encoded HARQ-ACK and the encoded BI are re-allocated to the RE occupied by the PUSCH.

Figure 8:
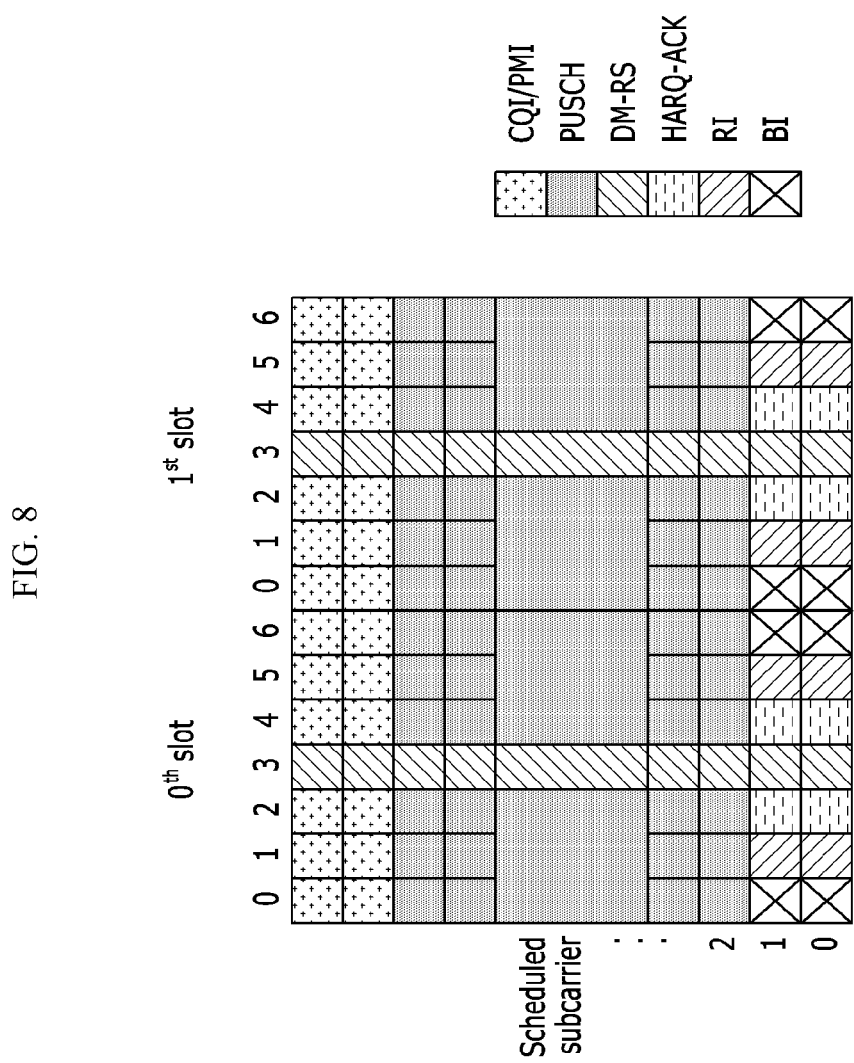

Method 430: Case in which BI is Mapped to Symbol Different from HARQ-ACK and RI In the method 430, the encoded BI may be allocated to symbols different from the encoded HARQ-ACK and the encoded RI. That is, the encoding BI may be allocated to other symbol indices, not to a symbol index that may be potentially occupied by the RI, the PUSCH, the DM-RS, and the HARQ-ACK. Referring to FIG. 8, the encoded BI is allocated to a $0^{th}$ symbol and a $6^{th}$ symbol of each slot. In this case, the PUSCH RE mapping may be performed avoiding the encoded BI. When the terminal transmits a sounding RS, the encoded BI and PUSCH are not transmitted at a $6^{th}$ symbol of a first slot. Therefore, the RE mapping of the encoded BI may be determined depending on the presence or absence of the sounding RS. For example, when the terminal transmits the sounding RS, the encoded BI is not mapped to the $6^{th}$ symbol of the $1^{st}$ slot but may be mapped to a $0^{th}$ symbol of a $0^{th}$ slot.

Method 440: Case in which BI and RI is Jointly Encoded

The terminal may jointly encode the BI and the RI by the method 610 or method 620 or method 630. The bit stream acquired by jointly encoding BI and RI is modulated and then may be mapped to the same RE. That is, the BI and the RI may be allocated to the same RE.

According to an exemplary embodiment, it is possible to provide the indication information of the beam or the indication information of the reference resource so that the base station may efficiently perform the vertical beamforming and provide the PMI component of the double codebook as the CSI feedback information.

Figure 9:
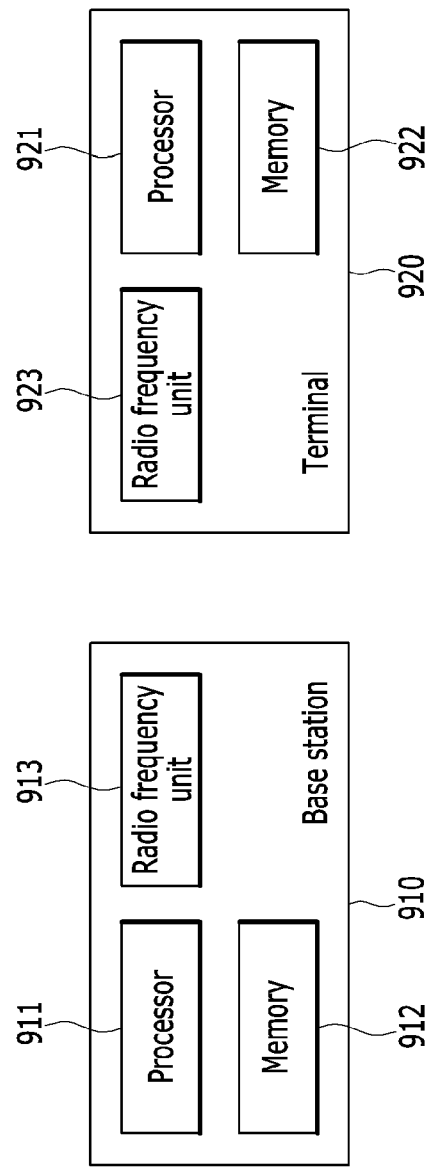
FIG. 9 is a block diagram illustrating a wireless communication system according to an exemplary embodiment.

FIG. 9 is a block diagram illustrating a wireless communication system according to an exemplary embodiment.

Referring to FIG. 9, a wireless communication system according to an exemplary embodiment includes a base station 910 and a terminal 920. The base station 910 includes a processor 911, a memory 912, and a radio frequency unit (RF unit) 913. The memory 912 may be connected to the processor 911 to store various pieces of information for driving the processor 911 or at least one program executed by the processor 911. The radio frequency unit 913 may be connected to the processor 911 to transmit/receive a wireless signal. The processor 911 may implement functions, processes, or methods proposed by the exemplary embodiment of the present disclosure. In this case, in the wireless communication system according to the exemplary embodiment, a wireless interface protocol layer may be implemented by the processor 911. An operation of the base station 910 according to the exemplary embodiment may be implemented by the processor 911.

The terminal 920 includes a processor 921, a memory 922, and a radio frequency unit 923. The memory 922 may be connected to the processor 921 to store various pieces of information for driving the processor 921 or at least one program executed by the processor 921. The radio frequency unit 923 may be connected to the processor 921 to transmit/receive a wireless signal. The processor 921 may implement functions, processes, or methods proposed by the exemplary embodiment of the present disclosure. In this case, in the wireless communication system according to the exemplary embodiment, a wireless interface protocol layer may be implemented by the processor 921. An operation of the terminal 920 according to the exemplary embodiment may be implemented by the processor 921.

According to the exemplary embodiment, the memory may be positioned inside or outside the processor and the memory may be connected to the processor through already known various means. The memory is various types of volatile or non-volatile storage media. For example, the memory may include a read-only memory (ROM) or a random access memory (RAM).

Although the exemplary embodiments are described in detail, the scope of the present invention is not limited thereto but various variations or alternations by those skilled in the art using a basic concept defined in the following claims are considered to be included in the scope of the present invention.

What is claimed is:

1. A terminal, comprising:
a processor, a memory, and a radio frequency unit,
wherein the processor executes a program stored in the memory to perform:
receiving a channel state information-reference signal (CSI-RS) from a base station;
generating CSI feedback information including rank indication (RI), a beam index (BI), at least one wideband (WB) channel quality indicator (CQI), a WB first precoding matrix indicator (PMI), and a WB second PMI, on the basis of the CSI-RS;
transmitting the RI, the WB first PMI, and the BI in an uplink subframe corresponding to periodicity of a first feedback subframe; and
transmitting the at least one WB CQI and the WB second PMI in an uplink subframe corresponding to periodicity of a second feedback subframe,
wherein when transmitting the RI, the WB first PMI, and the BI in an uplink subframe corresponding to periodicity of a first feedback subframe, the processor performs:
jointly encoding the RI and the WB first PMI;
concatenating the encoded RI and WB first PMI to the BI to generate a bit stream; and
performing channel coding for the bit stream by using a linear block code.

2. The terminal of claim 1, wherein:
the BI is the CSI feedback information used to transmit indication information of a beam transmitting the CSI-RS or indication information of a CSI-RS resource to the base station.

3. The terminal of claim 1, wherein the linear block code is a (20, 5+$Q_{BI}$) linear block code wherein the $O_{BI}$ is a number of bits of the BI.

4. The terminal of claim 1, wherein:
the at least one WB CQI includes a WB spatial differential CQI of 3 bits representing a difference between two WB CQIs.

5. The terminal of claim 1, wherein:
the WB first PMI and the WB second PMI are elements of a double codebook and the PMI of the double codebook is represented by a matrix multiplication or a Kronecker product of the WB first PMI and the WB second PMI, or represented by a pair of index that indicates the WB first PMI and the WB second PMI.

6. A terminal, comprising:
a processor, a memory, and a radio frequency unit,
wherein the processor executes a program stored in the memory to perform:
receiving a channel state information-reference signal (CSI-RS) from a base station;
generating CSI feedback information including rank indication (RI), a beam index (BI), a precoding type indicator (PTI), at least one wideband channel quality indicator (WB CaI), a WB first precoding matrix indicator (PMI), and a WB second PMI, on the basis of the CSI-RS;
transmitting the RI, the PTI, and the BI in an uplink subframe corresponding to periodicity of a first feedback subframe; and
when the PTI represents a first value,
transmitting the WB first PMI in an uplink subframe corresponding to periodicity of a second feedback subframe; and
transmitting the at least one WB CQI and the WB second PMI in an uplink subframe corresponding to periodicity of a third feedback subframe,
wherein when transmitting the RI, the PTI, and the BI in an uplink subframe corresponding to periodicity of a first feedback subframe, the processor performs:
concatenating the BI, the RI, and the PTI to generate a bit stream; and
performing channel coding for the bit stream by using a linear block code.

7. The terminal of claim 6, wherein:
the processor executes the program to further perform:
generating CSI feedback information including at least one subband channel quality indicator (SB CaI), an SB second PMI, and an SB index, on the basis of the CSI-RS, and when the PTI represents a second value,
transmitting the at least one WB CQI and the WB second PMI in the uplink subframe corresponding to the periodicity of the second feedback subframe; and
transmitting the at least one SB CQI, the SB second PMI, and the SB index in the uplink subframe corresponding to the periodicity of the third feedback subframe.

8. The terminal of claim 6, wherein:
the BI is the CSI feedback information used to transmit indication information of a beam transmitting the CSI-RS or indication information of a CSI-RS resource to the base station.

9. The terminal of claim 6, wherein:
when the processor performs transmitting the RI, the PTI, and the BI in the uplink subframe corresponding to the periodicity of the first feedback subframe,
the processor further performs jointly encoding the RI, the PTI, and the BI.

10. The terminal of claim 6, wherein the linear block code is a (20, $Q_{RI}+1+Q_{BI}$) linear block code wherein the $Q_{RI}$ is a number of bits of the RI and the $O_{BI}$ is a number of bits of the BI.

11. The terminal of claim 6, wherein:
the at least one WB CQI includes a WB spatial differential CQI of 3 bits representing a difference between two WB CQIs.

12. The terminal of claim 6, wherein:
the at least one SB CQI includes a SB spatial differential CQI of 3 bits representing a difference between two SB CQIs.

* * * * *